(12) United States Patent
Li et al.

(10) Patent No.: US 11,665,274 B2
(45) Date of Patent: May 30, 2023

(54) CALL METHOD AND APPARATUS

(71) Applicant: Huawei Technologies Co., Ltd., Shenzhen (CN)

(72) Inventors: Fusheng Li, Shenzhen (CN); Shengfeng Zhou, Shenzhen (CN); Yi Yu, Shenzhen (CN); Wei Yuan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/636,792

(22) PCT Filed: Aug. 6, 2020

(86) PCT No.: PCT/CN2020/107385
§ 371 (c)(1),
(2) Date: Feb. 18, 2022

(87) PCT Pub. No.: WO2021/031865
PCT Pub. Date: Feb. 25, 2021

(65) Prior Publication Data
US 2022/0294896 A1    Sep. 15, 2022

(30) Foreign Application Priority Data
Aug. 21, 2019  (CN) .......................... 201910774468.9

(51) Int. Cl.
*H04M 1/72484*   (2021.01)
*H04M 1/72409*   (2021.01)
*H04M 1/60*      (2006.01)

(52) U.S. Cl.
CPC ..... *H04M 1/72484* (2021.01); *H04M 1/6058* (2013.01); *H04M 1/72409* (2021.01)

(58) Field of Classification Search
CPC .......... H04M 1/72484; H04M 1/6058; H04M 1/72409
See application file for complete search history.

(56) References Cited

U.S. PATENT DOCUMENTS

| | | | |
|---|---|---|---|
| 2007/0124459 A1 | 5/2007 | Kasama | |
| 2014/0370864 A1* | 12/2014 | Lin | H04M 3/42042 455/418 |
| 2019/0253549 A1* | 8/2019 | Skolnick | H04M 15/83 |

FOREIGN PATENT DOCUMENTS

| | | | |
|---|---|---|---|
| CN | 102833404 A | | 12/2012 |
| CN | 103699501 A | * | 4/2014 |

(Continued)

OTHER PUBLICATIONS

EP/20854182, Search Report, dated Sep. 22, 2022.
JP/2022-511004, Office Action, dated Sep. 27, 2022.

*Primary Examiner* — Farid Seyedvosoghi
(74) *Attorney, Agent, or Firm* — Leydig, Voit & Mayer, Ltd.

(57) ABSTRACT

Embodiments of this application disclose a call method and an apparatus. In the call method, when a user does not actively select an audio device as a voice pickup device and a voice play device, after establishing a call connection to another electronic device, an electronic device selects, from available audio devices, an audio device that meets a user expectation as the voice pickup device and the voice play device. According to technical solutions provided in the embodiments of this application, user experience in a call process can be improved.

22 Claims, 25 Drawing Sheets

(56) References Cited

FOREIGN PATENT DOCUMENTS

| | | | |
|---|---|---|---|
| CN | 103699501 A | 4/2014 | |
| CN | 104601815 A | 5/2015 | |
| CN | 105656523 A | 6/2016 | |
| CN | 106060232 A | 10/2016 | |
| CN | 106375576 A | 2/2017 | |
| CN | 106412303 A | 2/2017 | |
| CN | 108289298 A | 7/2018 | |
| CN | 109660842 A | 4/2019 | |
| CN | 109788114 A | 5/2019 | |
| CN | 110113739 A | 8/2019 | |
| CN | 110602312 A | 12/2019 | |
| DE | 60037878 T2 * | 1/2009 | ............. H04M 1/05 |
| EP | 3188460 A1 | 7/2017 | |
| EP | 3063929 B1 | 6/2019 | |
| JP | 2000196707 A | 7/2000 | |
| JP | 2011211702 A | 10/2011 | |
| JP | 2012147063 A | 8/2012 | |
| JP | 2013207799 A | 10/2013 | |
| WO | WO-2014127712 A1 * | 8/2014 | ......... H04M 1/6033 |

\* cited by examiner

CALL METHOD AND APPARATUS

CROSS-REFERENCE TO RELATED APPLICATIONS

This application is a national stage of International Application No. PCT/CN2020/107385, filed on Aug. 6, 2020, which claims priority to Chinese Patent Application No. 201910774468.9, filed on Aug. 21, 2019. Both of the aforementioned applications are hereby incorporated by reference in their entireties.

TECHNICAL FIELD

This application relates to the field of terminal technologies, and in particular, to a call method and an apparatus.

BACKGROUND

During a call, an electronic device such as a mobile phone or a tablet computer needs to collect audio of a local user and play audio of a peer user by using an audio device, so that the users at both the ends can successfully make a call to each other. With development of electronic technologies, there are increasingly more types of audio devices. The audio devices may include an earpiece/receiver (receiver), a speaker (speaker), and a microphone (microphone) that are configured on the electronic device, a wired headset and a wireless headset that are externally connected to the electronic device, and the like.

When a plurality of audio devices are available, a user expects that during a call, an electronic device can select an appropriate audio device to collect audio of a local user and play audio of a peer user. Therefore, a technical solution needs to be provided currently, so that during a call, the electronic device can select an appropriate audio device to collect audio of a local user and play audio of a peer user, to meet a user expectation and improve user experience.

SUMMARY

This application provides a call method and an apparatus. In the call method, an electronic device may select an audio device that meets a user expectation as a voice pickup device and a voice play device, to improve user experience.

According to a first aspect, an embodiment of this application provides a call method. The method is applied to a first electronic device. The method may include: connecting a first electronic device to a first external audio device; in response to a first operation received on the first external audio device, performing a first call process between the first electronic device and a second electronic device by using the first external audio device, where the first external audio device is configured to: in the first call process, collect audio around the first electronic device, and play audio around the second electronic device; ending the first call process; detecting a second operation entered on the first electronic device, where the second operation is used to receive a call request initiated by a third electronic device, or the second operation is used to initiate a call request to the third electronic device; and in response to the second operation, if the first external audio device is a default audio device, performing a second call process between the first electronic device and the third electronic device by using the first external audio device, where the first external audio device is configured to: in the second call process, collect audio around the first electronic device, and play audio around the third electronic device.

According to the method in the first aspect, a user may use an actively selected external audio device to make a call to a peer user. This meets a user expectation, to improve user experience.

With reference to the first aspect, in some embodiments, a dial button or an answer button is disposed on the first external audio device; and the first operation includes an operation performed on the dial button or an operation performed on the answer button.

According to a second aspect, an embodiment of this application provides a call method. The method is applied to a first electronic device. The method may include: A first electronic device performs a third call process between the first electronic device and a fourth electronic device by using a first audio device, where the first audio device is configured to: in the third call process, collect audio around the first electronic device, and play audio around the fourth electronic device; detects a third operation used to switch to a second audio device; in response to the third operation, continues performing the third call process by using the second audio device, where the second audio device is configured to: in the third call process, continue collecting audio around the first electronic device, and continue playing audio around the fourth electronic device; ends the third call process; detects a second operation entered on the first electronic device, where the second operation is used to receive a call request initiated by a third electronic device, or the second operation is used to initiate a call request to the third electronic device; and in response to the second operation, if the second audio device is a default audio device, performs a second call process between the first electronic device and the third electronic device by using the second audio device, where the second audio device is configured to: in the second call process, collect audio around the first electronic device, and play audio around the third electronic device.

According to the method in the second aspect, a user may use an audio device used after the user performs switching to make a call to a peer user in a call process, and still use the audio device used after the switching to make a call to the peer user in a next call process. This meets a user expectation, to improve user experience.

With reference to the second aspect, in some embodiments, before detecting, in the third call process that is between the first electronic device and the fourth electronic device and that is performed by the first electronic device by using the first audio device, the third operation used to switch to a second audio device, the first electronic device may further perform the following steps: displaying a first user interface, where the first user interface includes a control for switching an audio device; and displaying one or more audio device options in response to an operation detected on the control for switching an audio device, where the one or more audio device options include an option of an audio device configured on the first electronic device and an option of an external audio device to which the first electronic device is connected, and the one or more audio device options include an option of the second audio device; and the third operation used to switch to a second audio device includes an operation performed on the option of the second audio device.

With reference to the first aspect or the second aspect, in some embodiments, after performing the second call process between the first electronic device and the third electronic device, the first electronic device may further perform the following steps: ending the second call process; connecting the first electronic device to a second external audio device; detecting a fourth operation entered on the first electronic device, where the fourth operation is used to receive a call request initiated by a fifth electronic device, or the fourth operation is used to initiate a call request to the fifth electronic device; and in response to the fourth operation, if the second external audio device is a default audio device, performing a fourth call process between the first electronic device and the fifth electronic device by using the second external audio device, where the second external audio device is configured to: in the fourth call process, collect audio around the first electronic device, and play audio around the fifth electronic device. In this manner, the user may use an external audio device last connected to the electronic device to make a call to the peer user. This meets a user expectation, to improve user experience.

With reference to the first aspect or the second aspect, in some embodiments, after performing the second call process between the first electronic device and the third electronic device, the first electronic device may further perform the following steps: ending the second call process; detecting a fifth operation, where the fifth operation is used to receive a call request initiated by a sixth electronic device, or the fifth operation is used to initiate a call request to the sixth electronic device; displaying one or more audio device options and an OK control in response to the fifth operation, where the one or more audio device options include an option of an audio device configured on the first electronic device and an option of an external audio device to which the first electronic device is connected, and the one or more audio device options include an option of a third audio device; after detecting an operation of selecting the option of the third audio device, detecting a sixth operation performed on the OK control, and in response to the sixth operation, performing a fifth call process between the first electronic device and the sixth electronic device by using the third audio device, where the third audio device is configured to: in the fifth call process, collect audio around the first electronic device, and play audio around the sixth electronic device; ending the fifth call process; detecting a seventh operation entered on the first electronic device, where the seventh operation is used to receive a call request initiated by a seventh electronic device, or the seventh operation is used to initiate a call request to the seventh electronic device; and in response to the seventh operation, if the third audio device is a default audio device, performing a sixth call process between the first electronic device and the seventh electronic device by using the third audio device, where the third audio device is configured to: in the sixth call process, collect audio around the first electronic device, and play audio around the seventh electronic device. In this manner, the user may switch an audio device before a call, and still use an audio device used after the switching to make a call to the peer user in a next call process. This meets a user expectation, to improve user experience.

With reference to the first aspect or the second aspect, in some embodiments, before detecting the second operation entered on the first electronic device, the first electronic device may further receive the call request initiated by the third electronic device, and display a second user interface in response to the call request, where the second user interface includes an answer control and a hang-up control, and the second operation includes an operation performed on the answer control. In this case, the first electronic device serves as an end that receives the call request initiated by the third electronic device, and accepts the call request in response to the second operation, to establish a call connection to the third electronic device and perform the second call process.

With reference to the first aspect or the second aspect, in some embodiments, before detecting the second operation entered on the first electronic device, the first electronic device may further display a third user interface, where the third user interface includes an identifier associated with the third electronic device and a dial control, and the second operation includes an operation performed on the dial control. In this case, in response to the second operation, the first electronic device initiates the call request to the third electronic device, and after the third electronic device accepts the call request, establishes a call connection to the third electronic device and performs the second call process.

With reference to the first aspect or the second aspect, in some embodiments, the first electronic device may further connect to a new third external audio device in the second call process that is between the first electronic device and the third electronic device and that is performed by the first electronic device. If the new third external audio device is a default audio device, the first electronic device immediately uses the third external audio device to perform the second call process between the first electronic device and the third electronic device.

With reference to the first aspect or the second aspect, in some embodiments, the first electronic device stores one or more priorities of one or more audio devices, the one or more audio devices include an audio device configured on the first electronic device and an external audio device to which the first electronic device is connected, and an audio device with a highest priority is configured to perform a call process between the first electronic device and another electronic device. The first electronic device may update priorities of all audio devices with reference to the following several policies.

(1) When the user actively selects an audio device as a voice pickup device and a voice play device, the electronic device immediately adjusts a priority of the audio device actively selected by the user in a stack to the highest, and other audio devices in the stack are in descending order of priorities. If the audio device actively selected by the user is a default audio device, the adjustment operation takes effect continuously. If the audio device actively selected by the user is not a default audio device, the adjustment operation takes effect only in a current call process. After the current call ends, the electronic device adjusts the priority of the audio device actively selected by the user in the stack to a priority after priorities of all default audio devices.

For example, in the method in the first aspect, the first electronic device may adjust a priority of the first external audio device to the highest in response to the first operation received on the first external audio device.

(2) When the user switches an audio device and uses, as a voice pickup device and a voice play device, an audio device used after the switching, the electronic device immediately adjusts a priority of the audio device used after the switching in a stack to the highest, and other audio devices in the stack are in descending order of priorities. If the audio device used after the user performs the switching is a default audio device, the adjustment operation takes effect continuously. If the audio device used after the user performs the switching is not a default audio device, the adjustment operation takes effect only in a current call process. After the current call ends, the electronic device adjusts the priority of the audio device used after the user performs the switching in the stack to a priority after priorities of all default audio devices.

For example, in the method in the second aspect, the first electronic device may adjust a priority of the second audio device to the highest in response to the third operation.

For another example, in the foregoing optional embodiment, the first electronic device may adjust a priority of the third audio device to the highest in response to the sixth operation.

(3) When the electronic device is newly connected to an external audio device, if the external audio device to which the electronic device is newly connected is a default audio device, the electronic device adjusts a priority of the newly connected external audio device in a stack to the highest, and other audio devices in the stack are in descending order of priorities. If the external audio device to which the electronic device is newly connected is not a default audio device, a priority of the newly connected external audio device in a stack is lower than priorities of all default audio devices in the stack.

For example, in the foregoing optional embodiment, after the first electronic device is connected to the second external audio device, if the second external audio device is the default audio device, the first electronic device may adjust a priority of the second external audio device to the highest.

With reference to the first aspect or the second aspect, in some embodiments, the default audio device includes an audio device whose maximum decibel value existing during audio play is less than a threshold. In this way, when the user does not actively select an audio device as a voice pickup device and a voice play device, the electronic device selects, only from default audio devices, an audio device that meets a user expectation as the voice pickup device and the voice pickup device, so that user privacy can be prevented from being disclosed, and impact on other surrounding users can be reduced.

According to a third aspect, an embodiment of this application provides an electronic device. The electronic device is configured to perform the call method according to the first aspect. The electronic device includes one or more processors, a memory, and a display apparatus. The memory is coupled to the one or more processors, the memory is configured to store computer program code, the computer program code includes computer instructions, and the one or more processors invoke the computer instructions to enable the electronic device to perform the method according to any one of the first aspect or the possible implementations of the first aspect. For operations performed by the electronic device according to the third aspect and beneficial effects achieved by the electronic device, refer to related descriptions according to any one of the first aspect or the possible implementations of the first aspect. Details are not described herein again.

According to a fourth aspect, an embodiment of this application provides an electronic device. The electronic device is configured to perform the call method according to the second aspect. The electronic device includes one or more processors, a memory, and a display apparatus. The memory is coupled to the one or more processors, the memory is configured to store computer program code, the computer program code includes computer instructions, and the one or more processors invoke the computer instructions to enable the electronic device to perform the method according to any one of the second aspect or the possible implementations of the second aspect. For operations performed by the electronic device according to the fourth aspect and beneficial effects achieved by the electronic device, refer to related descriptions according to any one of the second aspect or the possible implementations of the second aspect. Details are not described herein again.

According to a fifth aspect, an embodiment of this application provides a computer program product including instructions. When the computer program product runs on an electronic device, the electronic device is enabled to perform the method according to any one of the first aspect or the possible implementations of the first aspect.

According to a sixth aspect, an embodiment of this application provides a computer-readable storage medium, including instructions. When the instructions are run on an electronic device, the electronic device is enabled to perform the method according to any one of the first aspect or the possible implementations of the first aspect.

According to a seventh aspect, an embodiment of this application provides a computer program product including instructions. When the computer program product runs on an electronic device, the electronic device is enabled to perform the method according to any one of the second aspect or the possible implementations of the second aspect.

According to an eighth aspect, an embodiment of this application provides a computer-readable storage medium, including instructions. When the instructions are run on an electronic device, the electronic device is enabled to perform the method according to any one of the second aspect or the possible implementations of the second aspect.

According to the technical solutions provided in the embodiments of this application, when the user does not actively select an audio device as a voice pickup device and a voice play device, after establishing a call connection to another electronic device, the electronic device selects, from available audio devices, an audio device that meets a user expectation as the voice pickup device and the voice play device, to improve user experience.

DESCRIPTION OF EMBODIMENTS

The following describes technical solutions in the embodiments of this application with reference to the accompanying drawings in the embodiments of this application.

In the descriptions of the embodiments of this application, unless otherwise specified, "/" means "or". For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions in the embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments of this application, unless otherwise specified, "a plurality of" means two or more.

After an electronic device establishes a call connection to another electronic device, the electronic device may perform a call process between the electronic device and the another electronic device based on the call connection. The call process between the electronic device and the another electronic device includes: The electronic device collects local audio, transmits the local audio to the another electronic device, receives peer audio of the another electronic device, and plays the peer audio. The call process enables a plurality of users to successfully call each other. There may be one or more other electronic devices that establish a call connection to the electronic device.

In a call process, an audio device configured to collect local audio may be referred to as a voice pickup device, and an audio device configured to play peer audio may be referred to as a voice play device.

The local audio includes an ambient sound around the electronic device, and the ambient sound may include a voice of a local user. The peer audio includes an ambient sound around another electronic device that establishes a call connection to the electronic device, and the ambient sound may include a voice of a peer user.

Figure 1A:
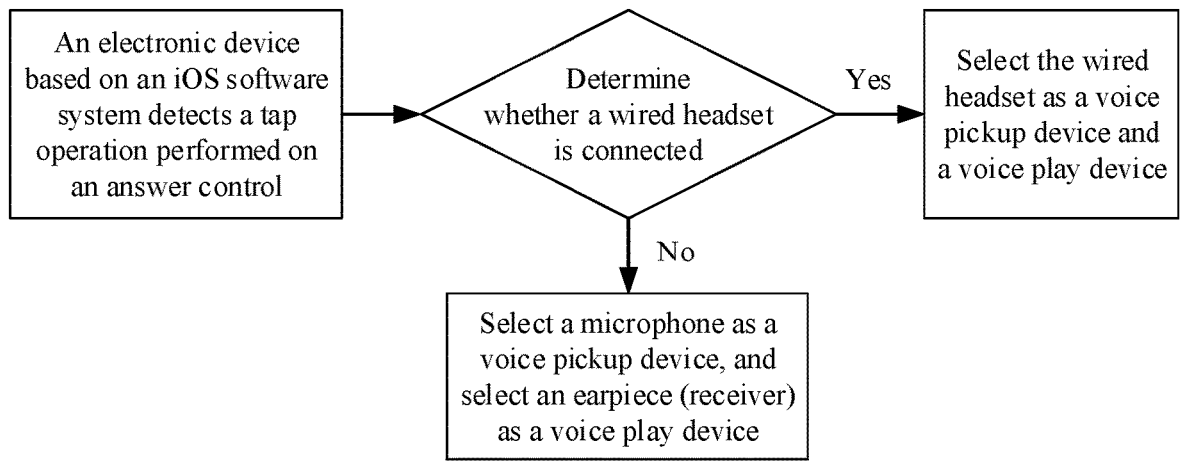
FIG. 1A is a schematic flowchart in which an electronic device based on an iOS software system selects a voice pickup device and a voice play device according to the conventional technology.

FIG. 1A is a schematic flowchart in which an electronic device based on an iOS software system selects a voice pickup device and a voice play device according to the conventional technology.

As shown in FIG. 1A, when receiving a call request from another electronic device, the electronic device may establish a call connection to the another electronic device in response to a tap operation performed on an answer control on a display or a slide operation on the display. After establishing the call connection, if a wired headset is connected to the electronic device, the electronic device selects the wired headset as a voice pickup device and a voice play device. If a wired headset is not connected to the electronic device, the electronic device selects a microphone configured on the electronic device as a voice pickup device, and selects an earpiece (receiver) configured on the electronic device as a voice play device.

A manner in which the electronic device selects the voice pickup device and the voice play device shown in FIG. 1A does not meet a user expectation, and therefore user experience is affected. For example, a user always wears a wireless headset and expects to make a call by using the wireless headset. However, after receiving the tap operation entered by the user on the answer control on the display, the electronic device does not select the wireless headset as the voice pickup device and the voice play device, but selects the connected wired headset as the voice pickup device and the voice play device.

Figure 1B:
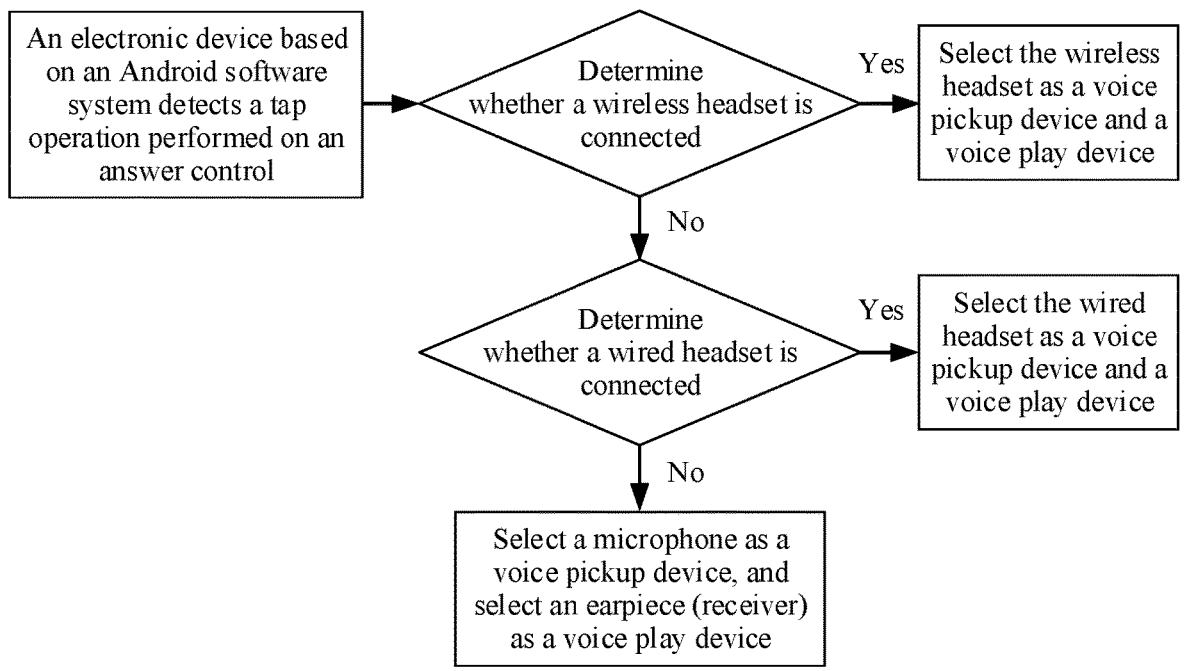
FIG. 1B is a schematic flowchart in which an electronic device based on an Android software system selects a voice pickup device and a voice play device according to the conventional technology.

FIG. 1B is a schematic flowchart in which an electronic device based on an Android software system selects a voice pickup device and a voice play device according to the conventional technology.

As shown in FIG. 1B, when receiving a call request from another electronic device, the electronic device may establish a call connection to the another electronic device in response to a tap operation performed on an answer control on a display or a slide operation on the display. After establishing the call connection, the electronic device selects a voice pickup device and a voice play device in a sequence of a wireless headset, a wired headset, and a microphone and an earpiece (receiver) that are configured on the electronic device.

A manner in which the electronic device selects the voice pickup device and the voice play device shown in FIG. 1B does not meet a user expectation, and therefore user experience is affected. For example, a user always wears the wired headset and expects to make a call by using the wired headset. However, after receiving the tap operation entered by the user on the answer control on the display, the electronic device does not select the wired headset as the voice pickup device and the voice play device, but selects the connected wireless headset as the voice pickup device and the voice play device.

Based on disadvantages of the conventional technology, an embodiment of this application provides a call method and an apparatus. When a user does not actively select an audio device as a voice pickup device and a voice play device, after establishing a call connection to another electronic device, an electronic device selects, from available audio devices, an audio device that meets a user expectation as the voice pickup device and the voice play device. According to the technical solutions provided in this embodiment of this application, when the user makes a call, the electronic device may select, from the available audio devices, the audio device that meets the user expectation to collect local audio and play peer audio, to improve user experience.

In the following embodiments of this application, the electronic devices may make a voice call or a video call based on the established call connection. The voice call means that the electronic devices transmit a voice to each other based on the call connection, and the video call means that the electronic devices transmit a voice and a real-time image to each other based on the call connection. In the following embodiments of this application, the call connection established between the electronic devices may include but is not limited to the following:

1. The electronic device runs a phone application and the call connection established between the electronic device and the another electronic device by using a subscriber identification module (subscriber identity module, SIM) number of the another electronic device, that is, a call connection established based on a phone service provided by an operator.

2. The electronic device runs an instant messaging application and the call connection established between the electronic device and the another electronic device, that is, a network-based call connection. The instant messaging application may include FaceTime, Skype, WeChat (WeChat), QQ, or the like. For example, the electronic device runs a connection established when WeChat (WeChat) initiates a voice call or a video call to the another electronic device.

In some embodiments of this application, the electronic device may be an end that initiates a call request. After the another electronic device that receives the call request accepts the call request, a call connection is successfully established between the electronic devices. In some other embodiments of this application, the electronic device may alternatively be an end that receives a call request initiated by the another electronic device. After the electronic device accepts the call request initiated by the another electronic device, a call connection is successfully established between the electronic devices.

In the following embodiments of this application, the voice pickup device and the voice play device that may be selected by the electronic device, that is, the voice pickup device and the voice play device that are available to the electronic device, may include the following types:

1. An Audio Device Configured on the Electronic Device (1) One or more microphones (microphone) configured on the electronic device, for example, a primary microphone disposed at the bottom of a mobile phone or a microphone disposed at the top of the mobile phone, where the microphone is a voice pickup device.

(2) An earpiece (receiver) configured on the electronic device, where the earpiece may also be referred to as a receiver, and the earpiece is a voice play device.

(3) A speaker (speaker) configured on the electronic device, where the speaker is a voice play device.

In this embodiment of this application, when the electronic device uses the earpiece as the voice play device, the electronic device also uses the microphone as the voice pickup device. Similarly, when the electronic device uses the speaker as the voice play device, the electronic device also uses the microphone as the voice pickup device.

2. An External Audio Device to which the Electronic Device is Connected in a Wired Manner The electronic device may establish a wired connection to the external audio device through a data interface (for example, a Type-C interface, a USB interface, a 3.5 mm headset interface, or a 2.5 mm headset interface) disposed on the electronic device. The external audio device to which the electronic device is connected in a wired manner may include a Type-C wired headset, a 3.5 mm wired headset, a 2.5 mm wired headset, a USB wired speaker, another audio device, or the like.

In some embodiments, apparatuses such as a microphone and a speaker may be configured on the external audio device to which the electronic device is connected in a wired manner. Therefore, the external audio device to which the electronic device is connected in a wired manner may be used as both a voice play device and a voice pickup device.

It may be understood that there may be one or more external audio devices to which the electronic device is connected in a wired manner.

In this embodiment of this application, when the electronic device uses the external audio device connected in a wired manner as the voice pickup device, the external audio device is specifically configured to: collect local audio, and send the local audio to the electronic device in a wired manner. When the electronic device uses the external audio device connected in a wired manner as the voice play device, the external audio device is specifically configured to: receive, in a wired manner, peer audio sent by the electronic device, and play the peer audio.

3. An External Audio Device to which the Electronic Device is Connected in a Wireless Manner The electronic device may establish a wireless connection to the external audio device by using a Bluetooth technology, or may establish a wireless connection to the external audio device in an infrared manner, a Wi-Fi manner, or another manner. The external audio device to which the electronic device is connected in a wireless manner may include but is not limited to a wireless headset (for example, a Bluetooth headset), a wireless speaker (for example, a Bluetooth speaker or a Wi-Fi speaker), a smart wearable device (for example, a smart watch or a smart band), a vehicle-mounted device, a smart television, or the like.

In some embodiments, apparatuses such as a microphone and a speaker may be configured on the external audio device to which the electronic device is connected in a wireless manner. Therefore, the external audio device to which the electronic device is connected in a wireless manner may be used as both a voice play device and a voice pickup device.

It may be understood that there may be one or more external audio devices to which the electronic device is connected in a wireless manner.

In this embodiment of this application, when the electronic device uses the external audio device connected in a wireless manner as the voice pickup device, the external audio device is specifically configured to: collect local audio, and send the local audio to the electronic device in a wireless manner. When the electronic device uses the external audio device connected in a wireless manner as the voice play device, the external audio device is specifically configured to: receive, in a wireless manner, peer audio sent by the electronic device, and play the peer audio.

In the following embodiments of this application, the electronic device may be connected to one or more external audio devices in both a wired manner and a wireless manner.

The following describes a case in which the user actively selects the audio device as the voice pickup device and the voice play device, and a case in which the user does not actively select the audio device as the voice pickup device and the voice play device.

In the following embodiments of this application, before or when the electronic device establishes a call connection to another electronic device, the user may actively select the audio device as the voice pickup device and the voice play device. In the embodiments of this application, audio devices actively selected by the user as voice pickup devices and voice play devices are external audio devices connected to the electronic device.

In the embodiments of this application, the user may actively select the audio device as the voice pickup device and the voice play device in the following two cases.

1. When the electronic device serves as an end that initiates a call request, the user may enter a user operation on an external audio device to which the electronic device is connected, to actively select the external audio device as the voice pickup device and the voice play device.

Specifically, the user may enter the user operation on the external audio device to which the electronic device is connected. After detecting the user operation, the external audio device may send a signal to the electronic device, where the signal is used to indicate that the external audio device detects the user operation. After receiving the signal, the electronic device may initiate a call request to another electronic device in response to the user operation. After the another electronic device accepts the call request, the electronic device establishes a call connection to the another electronic device. After establishing the call connection, the electronic device uses the external audio device that receives the user operation as the voice pickup device and the voice play device. Herein, the external audio device that receives the user operation may be an external audio device to which the electronic device is connected in a wired manner, or may be an external audio device to which the electronic device is connected in a wireless manner.

The user operation entered by the user on the external audio device to which the electronic device is connected may be considered as an operation used to actively select the audio device as the voice pickup device and the voice play device.

In Case 1, the user operation entered by the user on the external audio device to which the electronic device is connected may include but is not limited to an operation (for example, a double-tap operation or a touch and hold operation) entered on a dial button of the external audio device (for example, a Bluetooth headset or a wired headset), or a gesture or a voice instruction that is entered on the external audio device and that is used to trigger the electronic device to initiate a call request. The dial button may be a physical button or a virtual button.

Figure 2A:
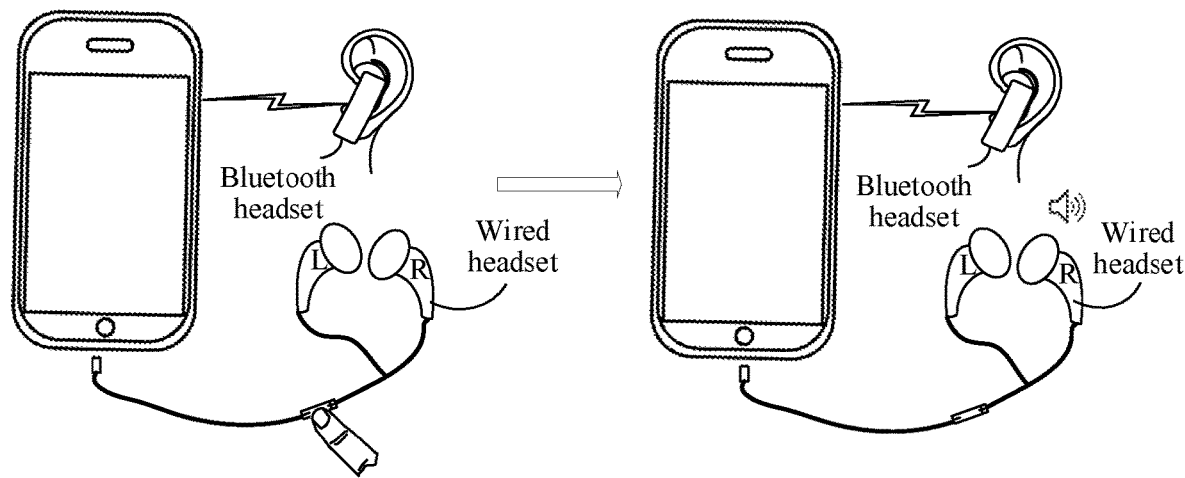
FIG. 2A, FIG. 2B, FIG. 3, FIG. 4a and FIG. 4b, FIG. 5A to FIG. 5D, and FIG. 6A to FIG. 6H are schematic diagrams of human-computer interaction according to an embodiment of this application.

FIG. 2A shows an example of a schematic diagram of a scenario in which an electronic device is connected to a wired headset in a wired manner and is connected to a Bluetooth headset in a wireless manner. In some embodiments, the user may enter a double-tap operation on a dial button of the Bluetooth headset, and the electronic device may initiate, in response to the operation, a call connection to another electronic device that has last initiated a call connection, and select the Bluetooth headset as a voice pickup device and a voice play device in response to the operation. In some other embodiments, the user may enter a double-tap operation on a dial button of the wired headset, and the electronic device may initiate, in response to the operation, a call connection to another electronic device that has last initiated a call connection, and select the wired headset as a voice pickup device and a voice play device in response to the operation. It may be understood that FIG. 2A shows a scenario in which the electronic device selects the wired headset as the voice pickup device and the voice play device in response to the double-tap operation entered by the user on the dial button of the wired headset.

2. When the electronic device serves as an end that receives a call request, the user may enter a user operation on an external audio device to which the electronic device is connected, to actively select the external audio device as the voice pickup device and the voice pickup device.

Specifically, when the electronic device receives a call request from another electronic device, the user may enter the user operation on the external audio device to which the electronic device is connected. After detecting the user operation, the external audio device may send a signal to the electronic device, where the signal is used to indicate that the external audio device detects the user operation. After receiving the signal, the electronic device may accept the call request in response to the user operation, to establish a call connection to the another electronic device. After establishing the call connection, the electronic device collects audio of the user and plays audio of a peer user by using the external audio device that receives the user operation. Herein, the external audio device that receives the user operation may be an external audio device to which the electronic device is connected in a wired manner, or may be an external audio device to which the electronic device is connected in a wireless manner.

In Case 2, the user operation entered by the user on the external audio device to which the electronic device is connected may include but is not limited to an operation (for example, a touch operation or a tap operation) entered on an answer button of the external audio device (for example, a Bluetooth headset, a wired headset, a smart watch, or a smart band), or a gesture or a voice instruction that is entered on the external audio device and that is used to trigger the electronic device to accept a call request. The answer button may be a physical button or a virtual button.

Figure 2B:
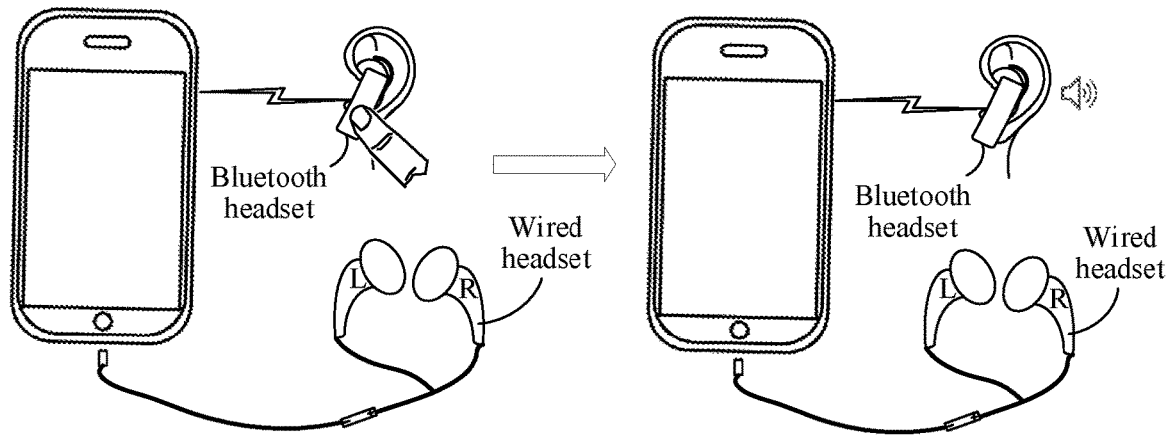

FIG. 2B shows an example of a schematic diagram of a scenario in which an electronic device is connected to a wired headset in a wired manner and is connected to a Bluetooth headset in a wireless manner. In some embodiments, when the electronic device receives a call request from another electronic device, the user may enter a tap operation on an answer button of the Bluetooth headset, and the electronic device may accept the call request in response to the operation, and select the Bluetooth headset as a voice pickup device and a voice play device in response to the operation. In some other embodiments, when the electronic device receives a call request from another electronic device, the user may enter a tap operation on an answer button of the wired headset, and the electronic device may accept the call request in response to the operation, and select the wired headset as a voice pickup device and a voice play device in response to the operation. It may be understood that FIG. 2B shows a scenario in which the electronic device selects the Bluetooth headset as the voice pickup device and the voice play device in response to the tap operation entered by the user on the answer button of the Bluetooth headset.

In the embodiments of this application, the user may not actively select the audio device as the voice pickup device and the voice play device in the following two cases.

1. In response to an operation entered by the user on the electronic device, the electronic device serves as an end that initiates a call request to initiate a call request to another electronic device. After the another electronic device accepts the call request, the electronic device establishes a call connection to the another electronic device. In this case, the user does not actively select the audio device as the voice pickup device and the voice play device. After establishing the call connection, the electronic device needs to select, from available audio devices, an audio device that meets a user expectation as the voice pickup device and the voice play device.

Herein, the operation entered by the user on the electronic device may include but is not limited to an operation (for example, a tap operation or a touch operation) entered on a display of the electronic device, an input voice instruction or gesture used to initiate a call request, or the like.

Figure 3:
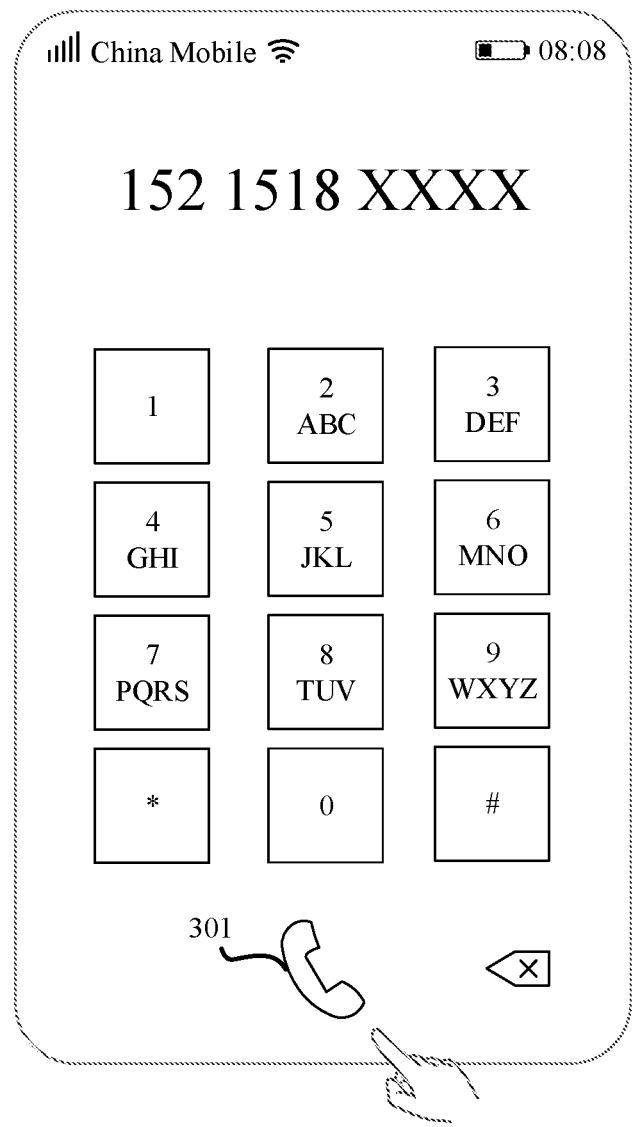

FIG. 3 shows an example of a user interface 31 displayed by an electronic device on a display. The user interface 31 may be provided by a phone application installed on the electronic device. As shown in FIG. 3, the user interface 31 includes a dial pad and a dial control 301. The user may enter, by using the dial pad, a phone number (for example, "1521518XXXX") of a user to which the user expects to make a call, and then enter an operation (for example, a tap operation or a touch operation) on the dial control 301. In response to the operation entered by the user on the dial control 301, the electronic device initiates a call request to another electronic device corresponding to the phone number.

In addition to the user interface 31 shown in FIG. 3, the electronic device may further initiate a call request to the another electronic device in response to an operation detected on another user interface provided by a phone application. The another user interface may include, for example, an interface used to display a call record, an interface used to display contact details, or the like.

In addition to the phone application shown in FIG. 3, the electronic device may further run an instant messaging application, and provide a corresponding user interface, for example, an interface used to display a status of communication with another contact. The user may enter an operation in the user interface, and the electronic device may initiate, in response to the operation, a call request to another electronic device corresponding to the another contact.

2. When the electronic device serves as an end that receives a call request, in response to an operation entered on the electronic device, the electronic device accepts a call request initiated by another electronic device, to establish a call connection to the another electronic device. In this case, the user does not actively select the audio device as the voice pickup device and the voice play device. After establishing the call connection, the electronic device needs to select, from available audio devices, an audio device that meets a user expectation as the voice pickup device and the voice play device.

Herein, the operation entered on the electronic device may include but is not limited to an operation entered on a display of the electronic device, an input voice instruction or gesture used to accept a call request, or the like.

Figure 4A:
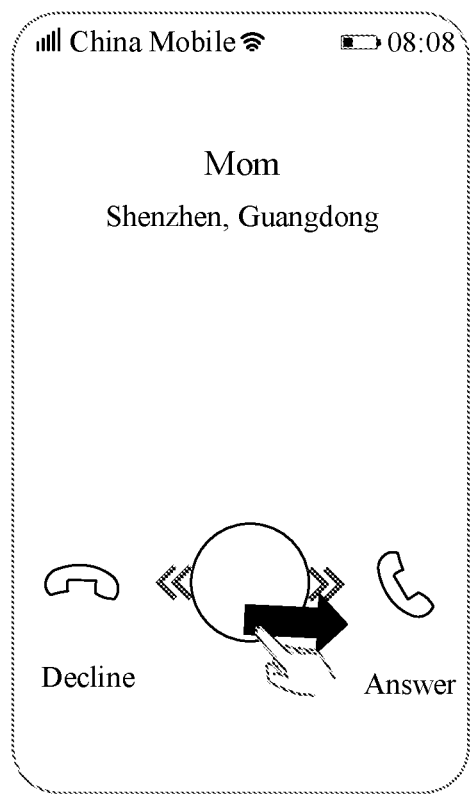
Figure 4B:
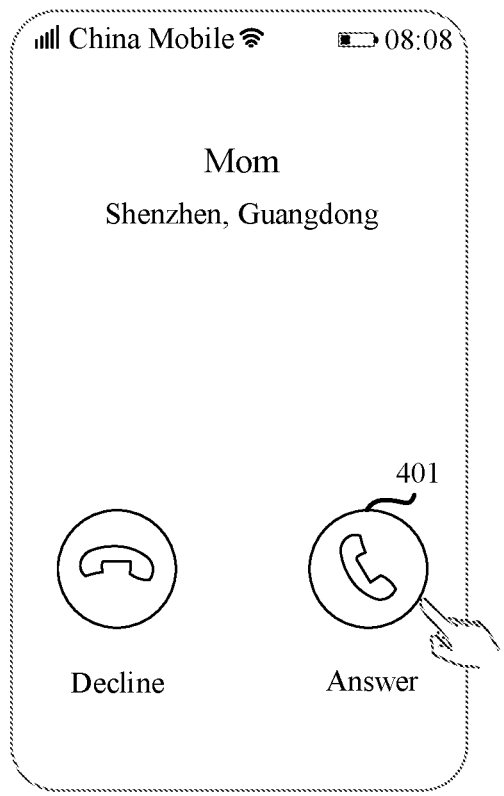

FIG. 4a and FIG. 4b each show an example of a user interface displayed by an electronic device on a display.

A user interface 41 shown in FIG. 4a is an interface displayed when the electronic device receives, in a screen-locked state, a call request initiated by another electronic device based on a phone service provided by an operator. As shown in the figure, the user may enter a slide operation in the user interface 41. For a track of the slide operation, refer to a track shown in the figure. In response to the slide operation, the electronic device accepts the call request initiated by the another electronic device, to establish a call connection to the another electronic device.

A user interface 42 shown in FIG. 4b is an interface displayed when the electronic device receives, in an unlocked state, a call request initiated by another electronic device based on a phone service provided by an operator. As shown in the figure, the user may enter an operation (for example, a tap operation or a touch operation) on an answer control 401 in the user interface 42. In response to this operation, the electronic device accepts the call request initiated by the another electronic device, to establish a call connection to the another electronic device.

In addition to the call request initiated based on the phone service provided by the operator shown in FIG. 4a and FIG. 4b, when receiving a network-based call request, the electronic device may further accept, in response to an operation entered on the electronic device, a call request initiated by another electronic device, to establish a call connection to the another electronic device. The network-based call request may include, for example, a call request initiated by the another electronic device by using an instant messaging application.

When the user does not actively select the audio device as the voice pickup device and the voice play device, that is, after the electronic device establishes the call connection to the another electronic device in the manner shown in FIG. 3 and FIG. 4, the following embodiments describe in detail how to select an audio device that meets a user expectation as the voice pickup device and the voice pickup device.

In the embodiments of this application, when the user does not actively select the audio device as the voice pickup device and the voice play device, the electronic device selects, only from default audio devices, an audio device that meets a user expectation as the voice pickup device and the voice pickup device, to avoid disclosing user privacy and reduce impact on other surrounding users.

For example, the default audio devices may include an earpiece (receiver) configured on the electronic device, and a wired headset (for example, a Type-C wired headset, a 3.5 mm/2.5 mm wired headset), a Bluetooth headset, a Bluetooth speaker, and a Bluetooth vehicle-mounted device that are connected to the electronic device, and the like. Non-default audio devices may include a speaker (speaker) configured on the electronic device, and a USB speaker, a Wi-Fi speaker, a Wi-Fi set-top box, a Wi-Fi television, a Bluetooth watch, and a Bluetooth band that are connected to the electronic device, and the like.

The following describes in detail a reason why each audio device in the foregoing example is considered as the default audio device or the non-default audio device and a manner in which the electronic device identifies the default audio device and the non-default audio device.

1. In a specific implementation, an audio device whose maximum decibel value existing during voice play is less than a threshold may be used as the default audio device, to avoid disclosing user privacy and reduce impact on other surrounding users. A maximum decibel value existing when an earpiece (receiver) plays a voice is less than the threshold. Therefore, the earpiece (receiver) is the default audio device. A maximum decibel value existing when a speaker (speaker) or the like plays a voice is greater than the threshold. Therefore, the speaker (speaker) is the non-default audio device.

2. A Bluetooth headset, a Bluetooth speaker, and a Bluetooth vehicle-mounted device that are connected to the electronic device through Bluetooth are the default audio devices, and a Bluetooth watch and a Bluetooth band that are connected to the electronic device through Bluetooth are the non-default audio devices.

Specifically, after the electronic device is connected to an external audio device through Bluetooth, because a related protocol of the Bluetooth technology does not specify that the external audio device needs to notify the electronic device of a device type (for example, a headset, a speaker, or a vehicle-mounted device) of the external audio device, if the electronic device does not actively query the type of the external audio device, the electronic device cannot determine the type of the external audio device.

In some embodiments, after the electronic device is connected to some external audio devices (for example, a Bluetooth headset, a Bluetooth speaker, and a Bluetooth vehicle-mounted device) through Bluetooth, interaction between the electronic device and the external audio device is simple, for example, only audio transmission is involved. In this case, the electronic device usually does not learn of a type of the connected external audio device. A maximum decibel value existing when the Bluetooth headset plays a voice is less than a threshold, and the Bluetooth headset is an audio device with high usage. The Bluetooth headset may also be used as the default audio device, to avoid disclosing user privacy and reduce impact on other surrounding users. The Bluetooth headset, the Bluetooth speaker, and the Bluetooth vehicle-mounted device may all be included in the default audio devices, to ensure that the default audio device includes the Bluetooth headset.

In some other embodiments, after the electronic device is connected to some external audio devices (for example, a Bluetooth watch and a Bluetooth band) through Bluetooth, interaction between the electronic device and the external audio device is complex, for example, audio transmission and data exchange are involved. In this case, the electronic device may determine a type of the external audio device by interacting with the external audio device, and learn that the connected external audio device is the Bluetooth watch or the Bluetooth band. Because a maximum decibel value existing when the Bluetooth watch or the Bluetooth band plays a voice is large, neither the Bluetooth watch nor the Bluetooth band is the default audio device.

3. A Type-C wired headset and a 3.5 mm/2.5 mm wired headset are the default audio devices, and a USB speaker is the non-default audio device.

After being connected to an external audio device in a wired manner, the electronic device may communicate with the external audio device through a connected interface. The electronic device may determine a type of the external audio device through the interface. Usually, an external audio device connected to the electronic device through a Type-C interface is a Type-C headset, an external audio device connected to the electronic device through a USB port is a USB speaker, and an external audio device connected to the electronic device through a 3.5 mm headset interface or a 2.5 mm headset interface is a headset. Because a maximum decibel value existing when the headset plays a voice is less than a threshold, the headset connected to the electronic device through the Type-C interface, the 3.5 mm headset interface, or the 2.5 mm headset interface is the default audio device. Because a decibel value existing when the USB speaker plays a voice is large, the USB speaker is the non-default audio device.

4. A Wi-Fi speaker, a Wi-Fi set-top box, and a Wi-Fi television are the non-default audio devices.

An external audio device to which the electronic device is connected through Wi-Fi may include the Wi-Fi speaker, the Wi-Fi set-top box, the Wi-Fi television, or the like. The Wi-Fi speaker, the Wi-Fi set-top box, the Wi-Fi television, and the like may be connected to one or more electronic devices through Wi-Fi, and are not controlled by only one electronic device. Therefore, the Wi-Fi speaker, the Wi-Fi set-top box, and the Wi-Fi television are the non-default audio devices, to avoid disclosing user privacy. In a specific implementation, the electronic device may consider all devices connected through Wi-Fi as the non-default audio devices.

When the user does not actively select the audio device as the voice pickup device and the voice play device, the following describes in detail several policies used when the electronic device selects, from default audio devices, an audio device that meets a user expectation as the voice pickup device and the voice play device.

(1) When no external audio device is connected, the electronic device selects an earpiece (receiver) configured on the electronic device as the voice play device, and selects a microphone configured on the electronic device as the voice pickup device.

(2) When an external audio device is connected, the electronic device selects, as the voice pickup device and the voice play device, an external audio device that is last connected and that is the default audio device.

An occasion on which the electronic device is last connected to the external audio device is not limited in this embodiment of this application. The electronic device may be connected to the external audio device before establishing a call connection to another electronic device, after establishing a call connection to the another electronic device, or in a call process between the electronic device and the another electronic device.

Figure 5A:
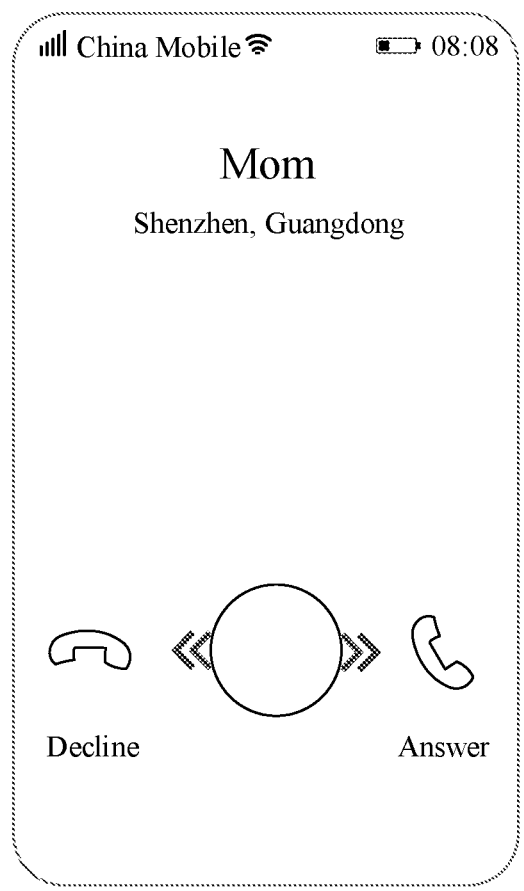
Figure 5B:
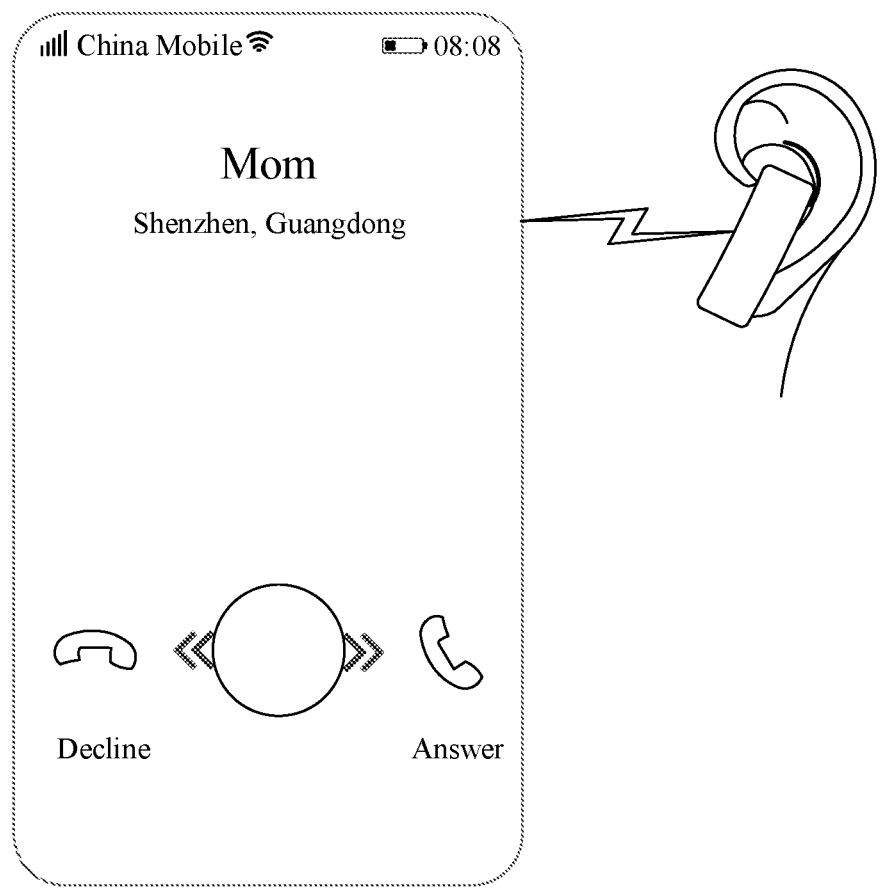
Figure 5C:
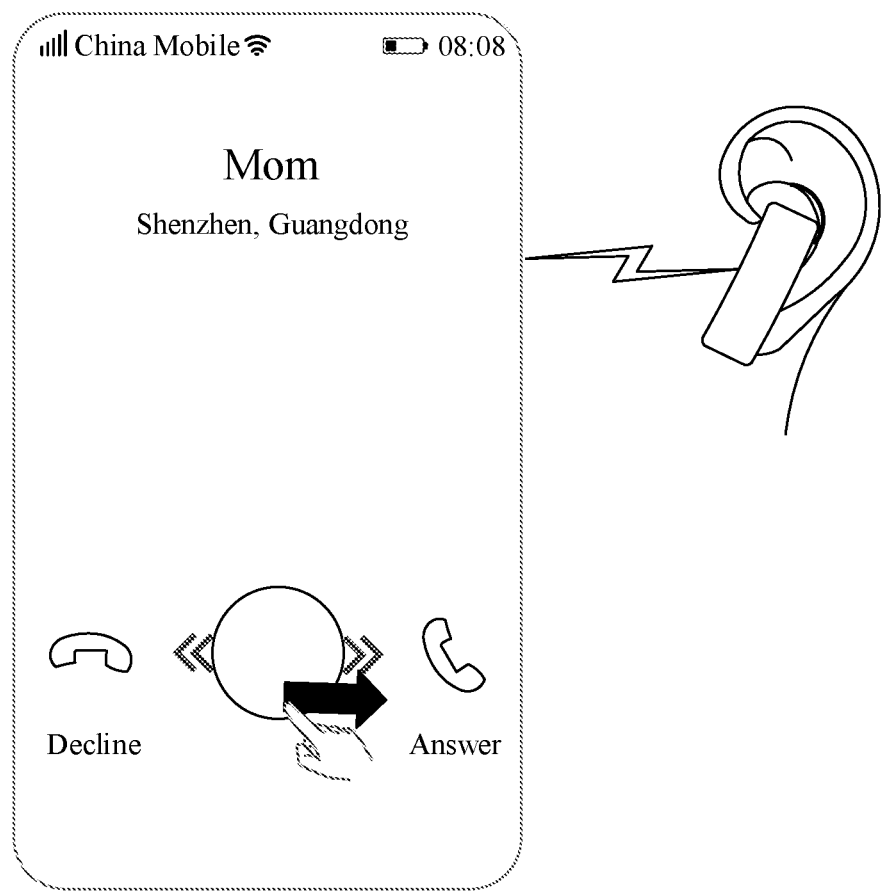
Figure 5D:
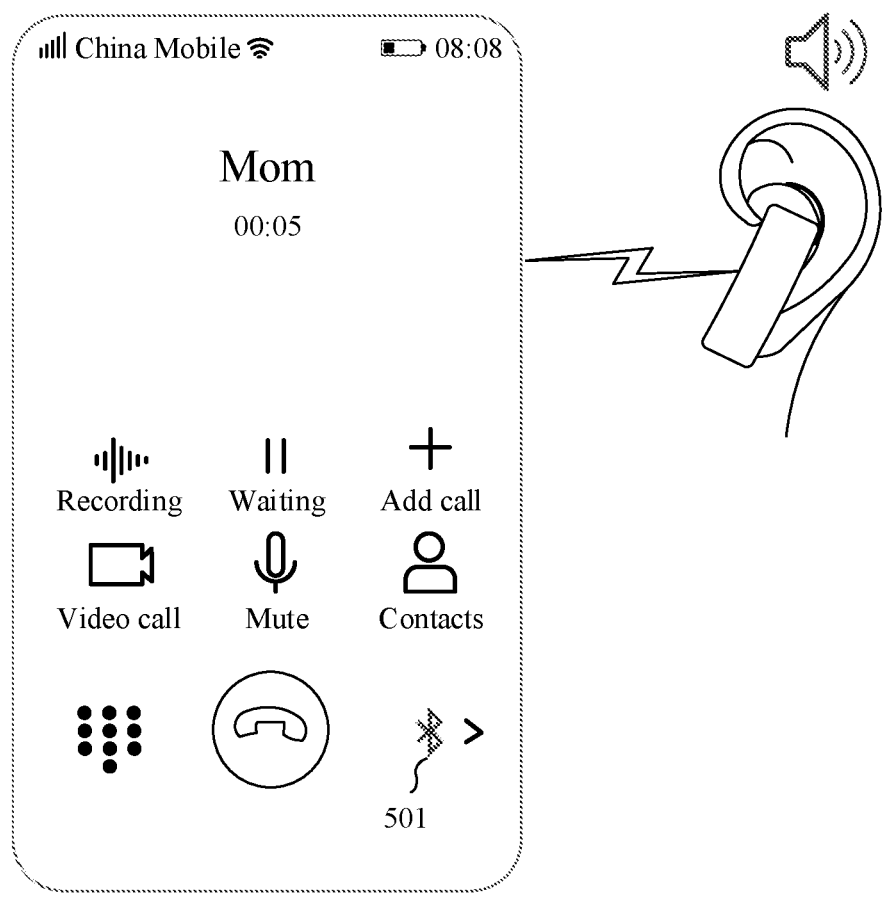

For example, refer to FIG. 5A. A user interface 51 shown in FIG. 5A is an image displayed when the electronic device receives, in a screen-locked state, a call request initiated by another electronic device. FIG. 5B is a schematic diagram of a scenario in which an electronic device is newly connected to a Bluetooth headset when receiving a call request. Refer to FIG. 5C and FIG. 5D. In response to a slide operation detected in the user interface 51, the electronic device may establish a call connection to another electronic device that initiates a call request, and select a Bluetooth headset that is last connected as a voice pickup device and a voice play device.

Refer to FIG. 5D. A user interface 52 shown in FIG. 5D is an image displayed after an electronic device establishes a call connection to another electronic device. As shown in FIG. 5D, the user interface 52 may include an icon 501 used to indicate a voice pickup device and a voice play device that are currently used by the electronic device. For example, the icon 501 may be a Bluetooth icon, and is used to indicate that the voice pickup device and the voice play device that are currently used by the electronic device are a Bluetooth device. In addition to the icon shown in FIG. 5D, the electronic device may further indicate, by using another visual element, the voice pickup device and the voice play device that are currently used by the electronic device, for example, may further indicate, by using a text, the voice pickup device and the voice play device that are currently used by the electronic device.

In addition to an example of a scenario in which the electronic device serves as an end that receives the call request that is shown in FIG. 5A to FIG. 5D, when the electronic device serves as an end that initiates a call request, if the user does not actively select an audio device as a voice pickup device and a voice play device, the electronic device may also select the voice pickup device and the voice pickup device by using Policy (2).

According to Policy (2), the user may use an external audio device last connected to the electronic device to make a call to a peer user. This meets a user expectation, to improve user experience.

(3) If the user has actively selected an audio device as the voice pickup device and the voice play device, and an audio device last and actively selected by the user is the default audio device, the electronic device selects the audio device as the voice pickup device and the voice play device.

Specifically, for a case in which the user actively selects the audio device as the voice pickup device and the voice play device, refer to related descriptions in the foregoing embodiments.

For example, when the electronic device previously receives a call request, the user taps an answer button of a Bluetooth headset. In this case, the electronic device establishes a call connection to another electronic device that initiates the call request, and uses the Bluetooth headset as the voice pickup device and the voice play device in the previous call process. The Bluetooth headset is the default audio device.

After the electronic device ends a previous call process, if the user initiates a call request to another electronic device in the manner shown in FIG. 3, or if the user accepts, in the manner shown in FIG. 4, a call request initiated by another electronic device, the electronic device uses a Bluetooth headset last and actively selected by the user as the voice pickup device and the voice play device in a current call process.

According to Policy (3), the user may use an external audio device that has been actively selected to make a call to a peer user. This meets a user expectation, to improve user experience.

(4) If the user has adjusted an audio device and uses, as the voice pickup device and the voice play device, an audio device used after the adjustment, and an audio device used after the user performs last adjustment is the default audio device, the electronic device selects the audio device as the voice pickup device and the voice play device.

The user may adjust the audio device as the voice pickup device and the voice play device in the following two manners.

(1) The user may adjust or switch a currently used voice pickup device and voice play device in a call process.

Figure 6A:
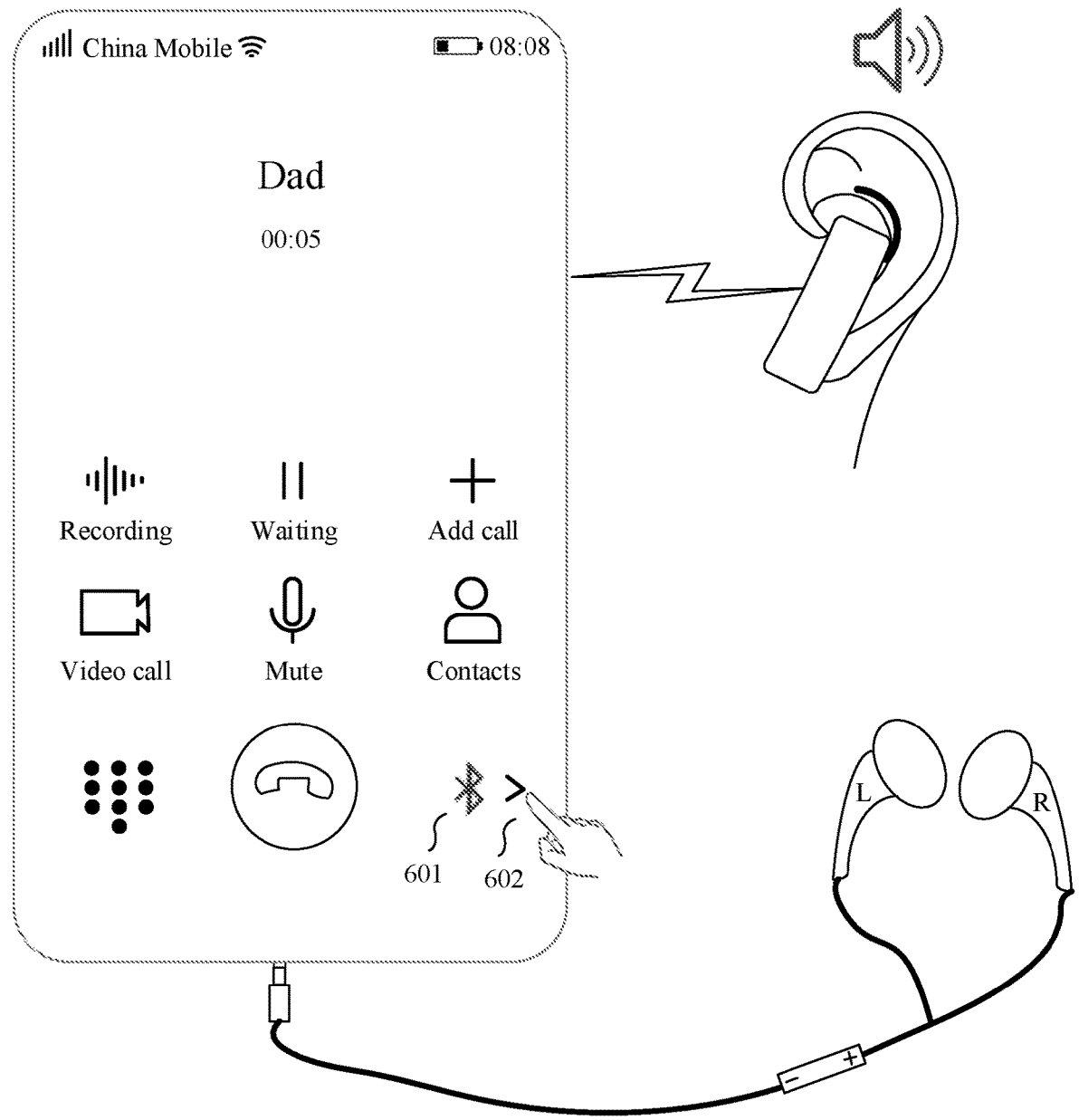
Figure 6B:
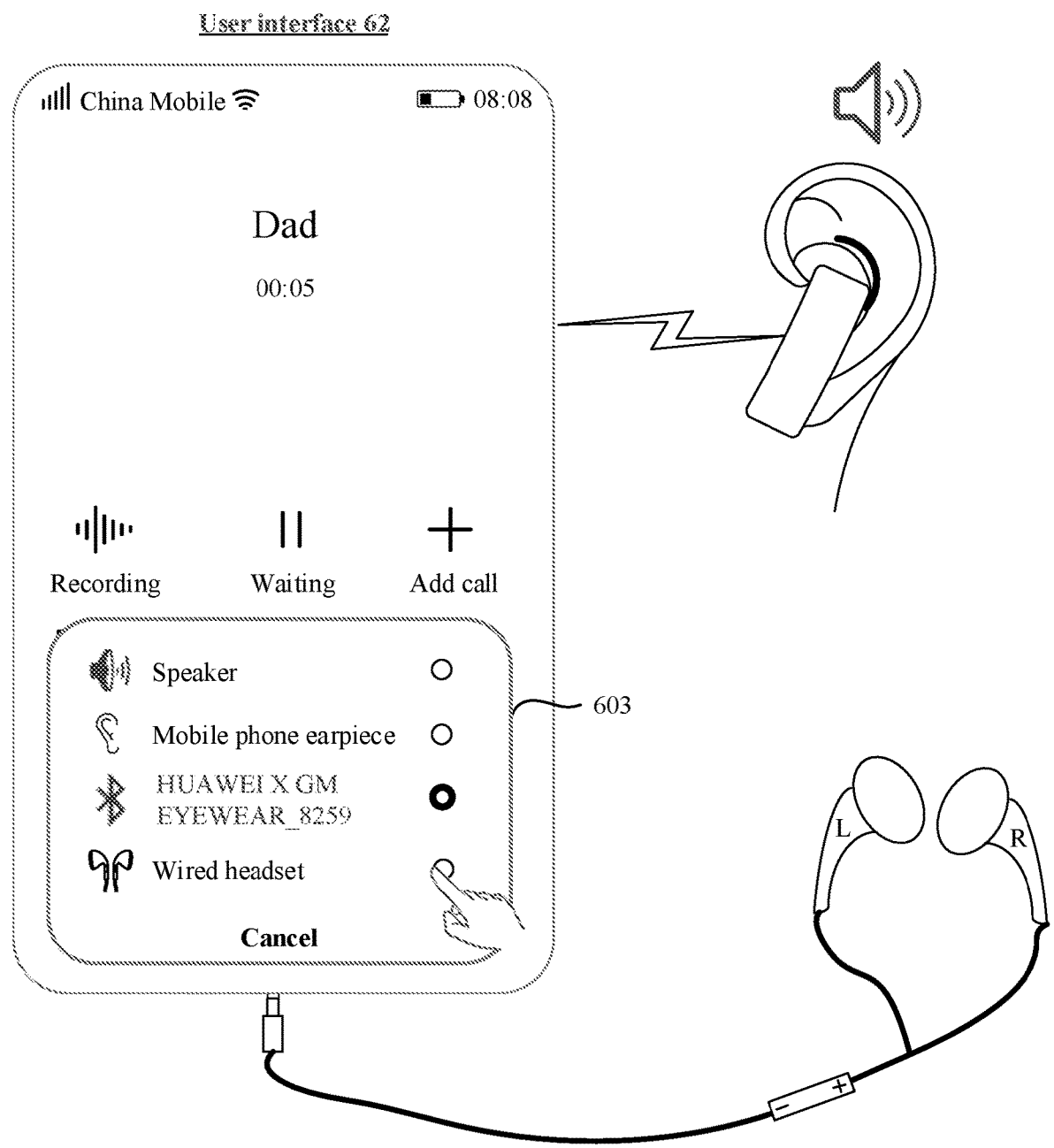
Figure 6C:
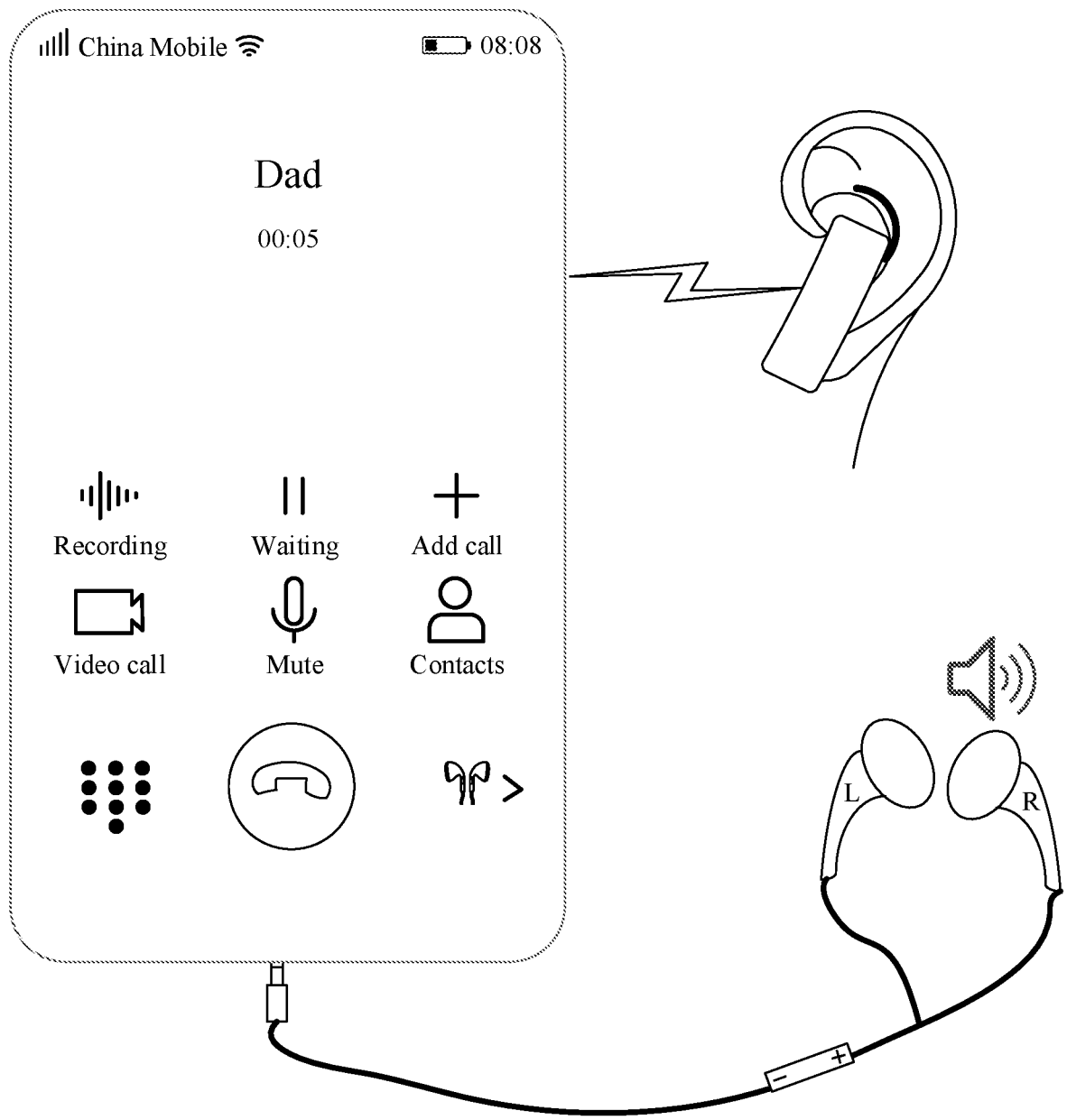

FIG. 6A to FIG. 6C are schematic diagrams of a scenario in which a user adjusts or switches a currently used voice pickup device and voice play device in a call process.

FIG. 6A shows a user interface 61 displayed by an electronic device in a previous call process. As shown in the figure, the user interface 61 includes an icon 601 used to indicate a voice pickup device and a voice play device that are used by the electronic device and a control 602.

Both the icon 601 and the control 602 may be used to listen to an operation (for example, a touch operation) used to view a currently available audio device. Refer to FIG. 6B. In response to an operation received on the icon 601 or the control 602, the electronic device displays, in the user interface 61, a list 603 of audio devices currently available to the electronic device, where the list 603 includes icons and/or texts of audio devices (for example, a speaker and an earpiece) configured on the electronic device, and icons and/or texts of external audio devices (for example, a Bluetooth headset and a wired headset) connected to the electronic device.

The icon and/or the text in the list 603 may be used to listen to a user operation (for example, a touch operation). In response to the user operation, the electronic device uses an audio device corresponding to the icon and/or the text as a voice pickup device and a voice play device.

Refer to FIG. 6C. In response to an operation detected on the text of the wired headset that is in the list 603 shown in FIG. 6B, the electronic device switches the voice pickup device and the voice play device from the Bluetooth headset to the wired headset. In addition to the switching manner shown in FIG. 6A to FIG. 6C, the user may further switch the voice pickup device and the voice play device in another manner. For example, the electronic device may further switch the voice pickup device and the voice play device in response to a voice instruction entered by the user.

Figure 6D:
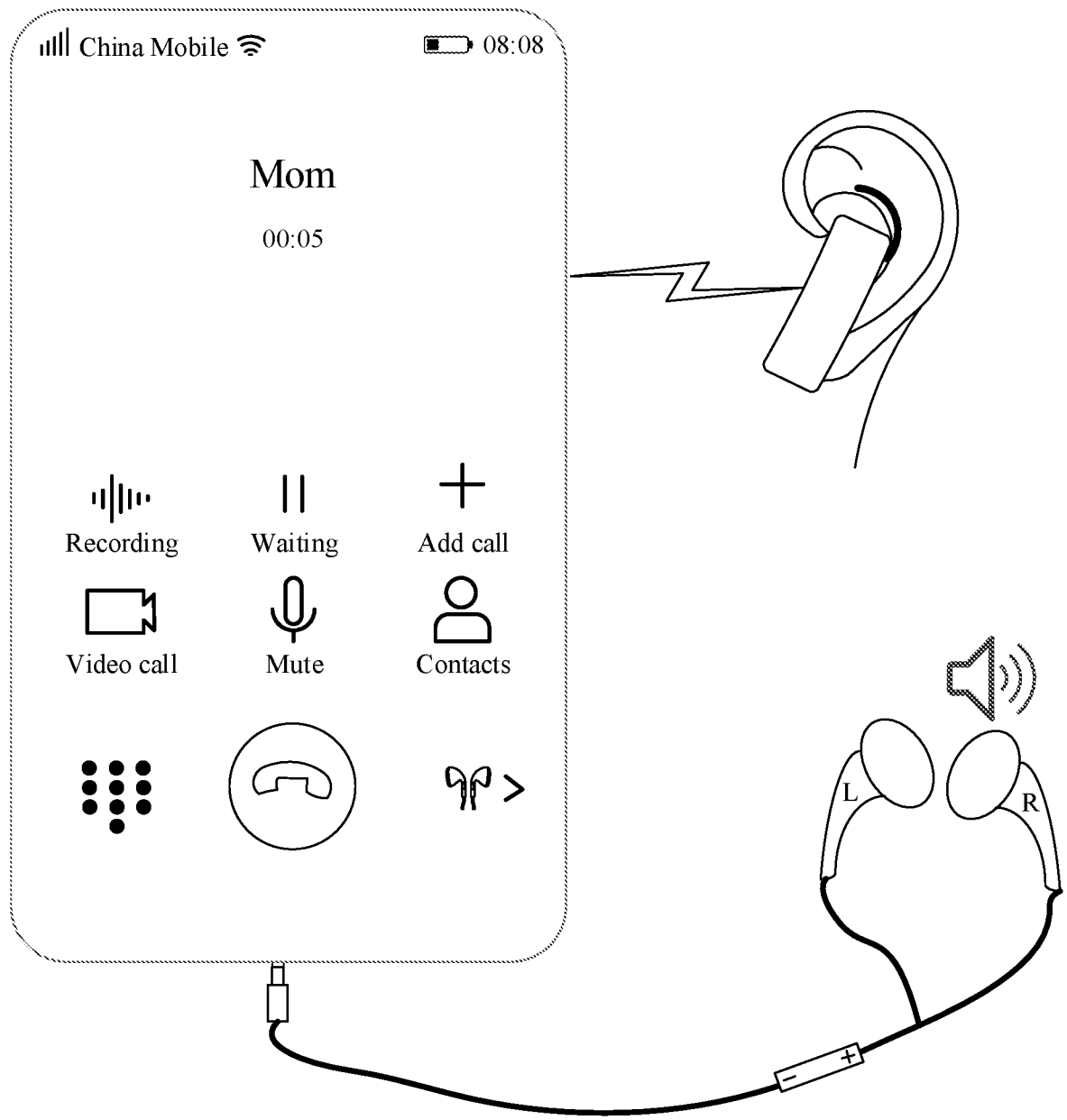

Refer to FIG. 6D. After the call process shown in FIG. 6A to FIG. 6C ends, in a next call process, if the user does not actively select an audio device as a voice pickup device and a voice play device, the electronic device selects, as the voice pickup device and the voice play device, an audio device (that is, the wired headset) used after the user performs last switching.

(2) Before the electronic device establishes a call connection to another electronic device, the user may adjust or switch a voice pickup device and a voice play device that are to be used by the electronic device in a call process.

FIG. 6E to FIG. 6H are schematic diagrams of a scenario in which before an electronic device initiates a call request to another electronic device, a user adjusts or switches a voice pickup device and a voice play device that are to be used by the electronic device in a call process.

Figure 6E:
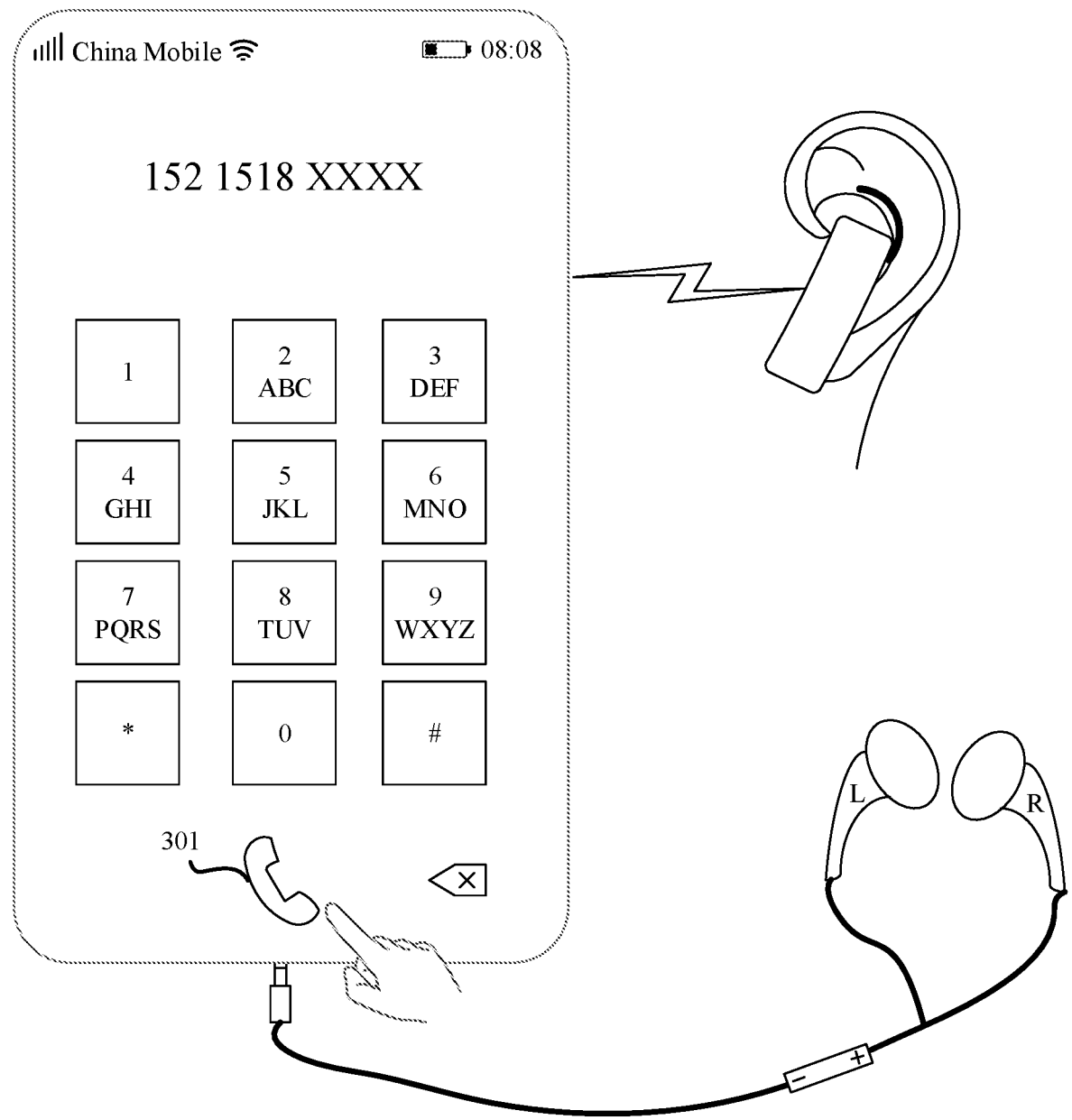

FIG. 6E shows a user interface 61 displayed by an electronic device on a display. The user interface 61 is the same as the user interface 31 shown in FIG. 3. For details, refer to the related descriptions.

Figure 6F:
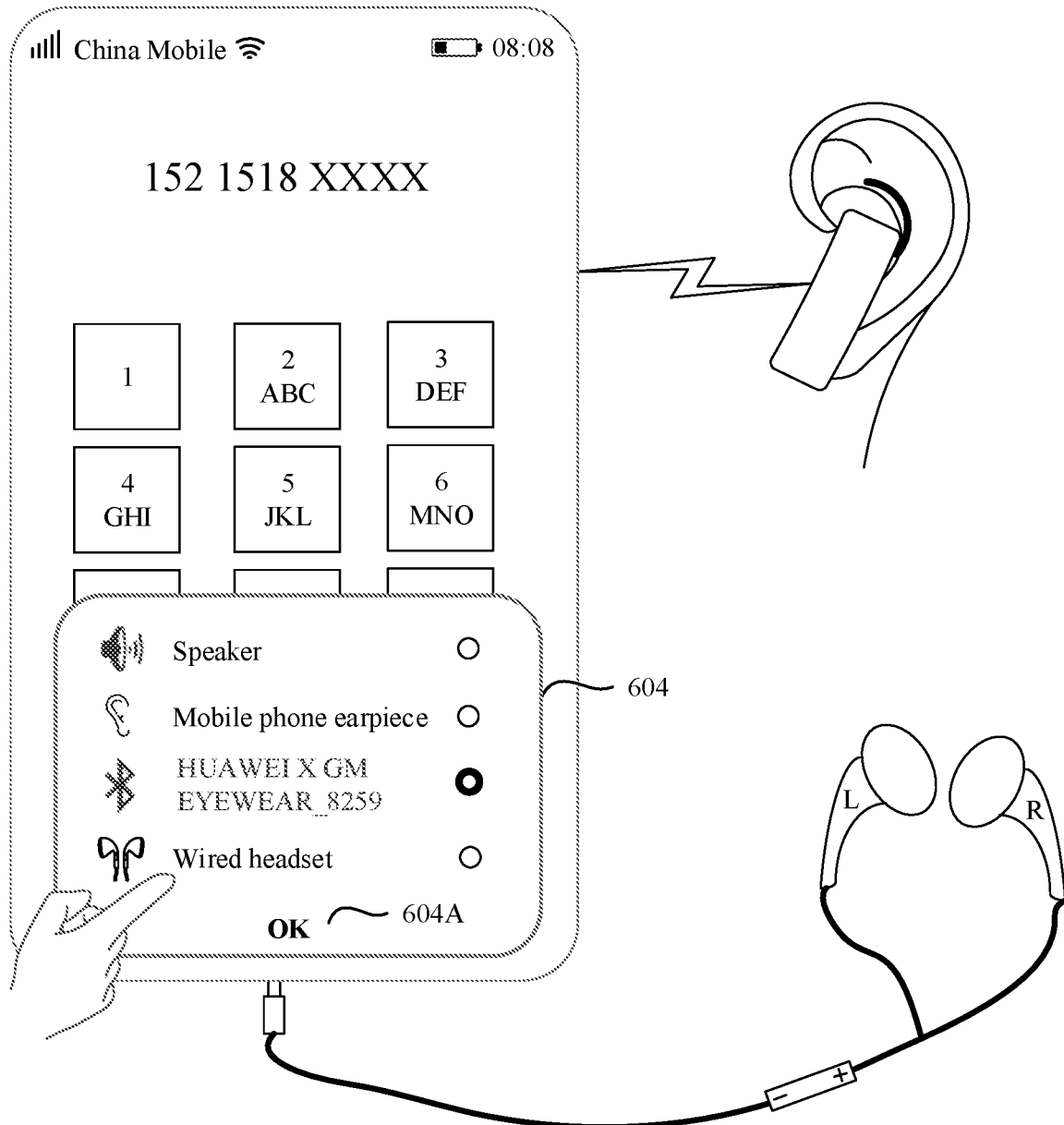

Refer to FIG. 6F. In some embodiments, when the electronic device receives an operation (for example, a tap operation or a touch operation) entered on a control 301 in the user interface 31, the electronic device may display, in the user interface 31, a list 604 of audio devices currently available to the electronic device, where the list 604 includes icons and/or texts of audio devices (for example, a speaker and an earpiece) configured on the electronic device, icons and/or texts of external audio devices (for example, a Bluetooth headset and a wired headset) connected to the electronic device, and a control 604A.

The electronic device may prompt the user with a voice pickup device and a voice play device that are to be used by the electronic device in a process of a call to be made to another user. Refer to FIG. 6F. The electronic device may display, in bold, the icon of the Bluetooth headset and/or a circle on the right side of the text, to notify the user that the electronic device is to use the Bluetooth headset as the voice pickup device and the voice play device in the process of the call to be made to the another user.

Figure 6G:
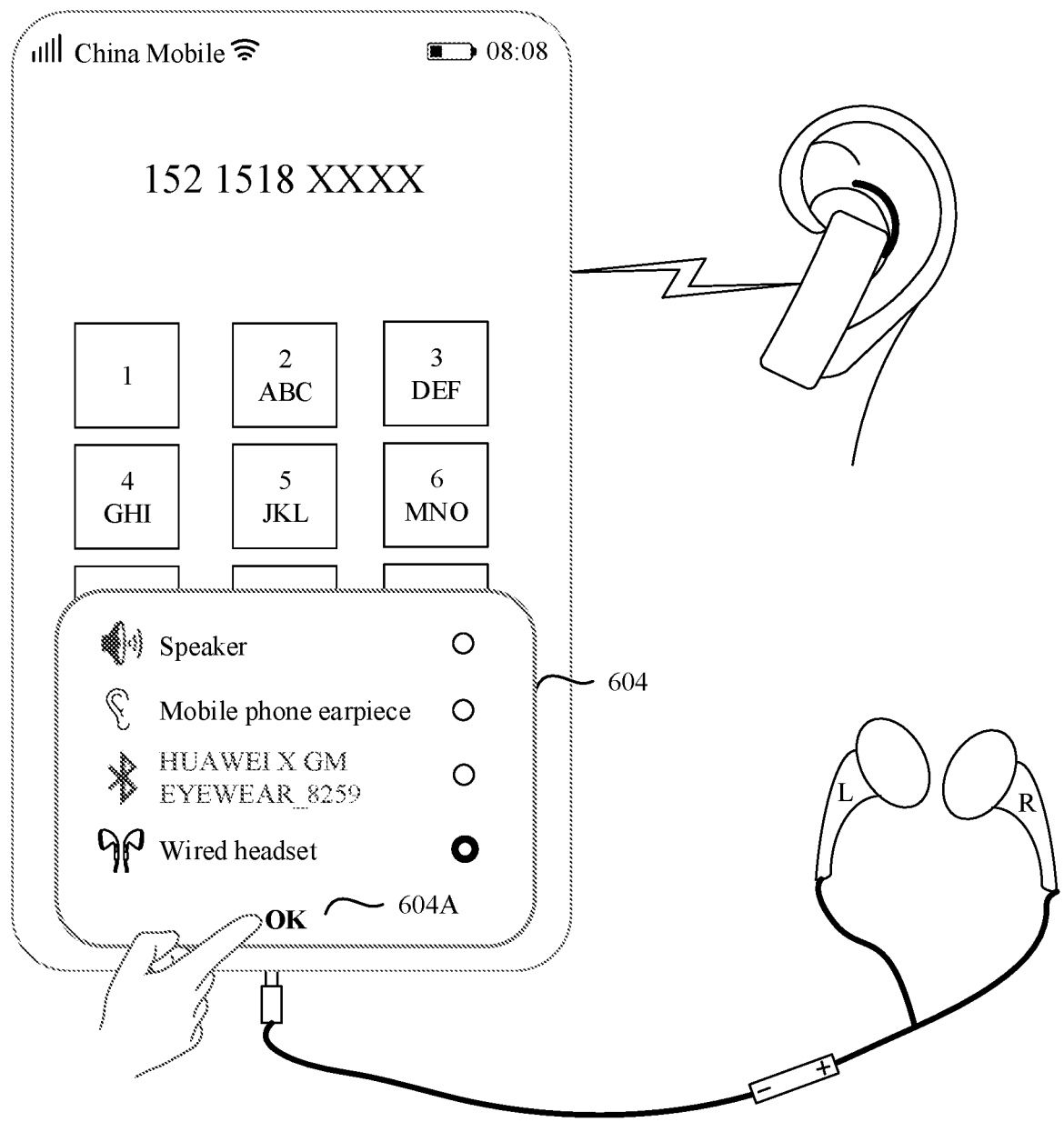

After learning that the electronic device is to use the Bluetooth headset as the voice pickup device and the voice play device in the process of the call to be made to the another user, the user may adjust, based on a requirement, the voice pickup device and the voice play device that are to be used by the electronic device in the process of the call to be made to the another user. As shown in FIG. 6F and FIG. 6G, in response to an operation detected on the text of the wired headset that is in the list 604 shown in FIG. 6F, the electronic device adjusts, from the Bluetooth headset to the wired headset, the voice pickup device and the voice play device that are to be used in the process of the call to be made to the another user.

Figure 6H:
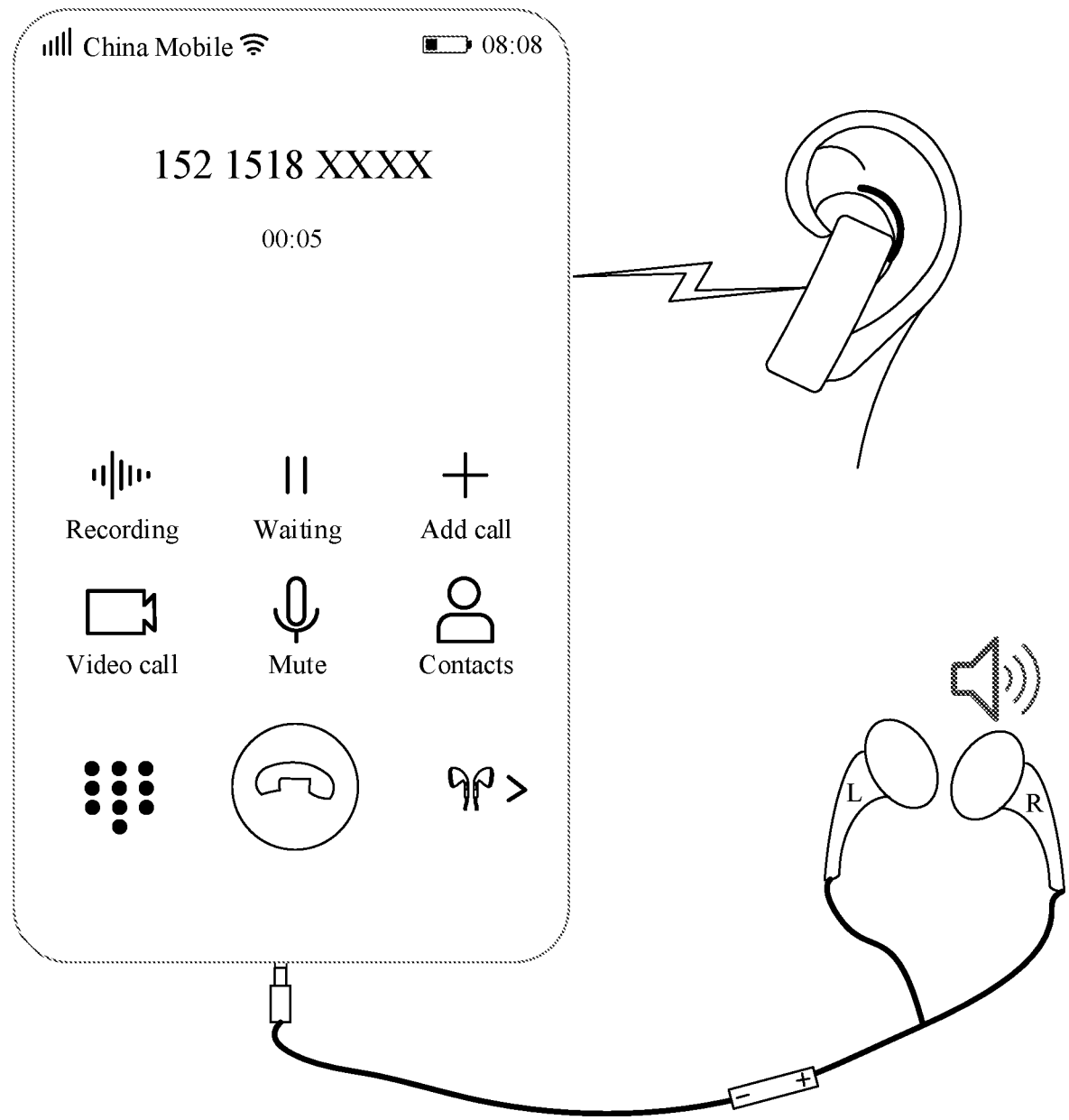

Refer to FIG. 6G. In response to an operation (for example, a touch operation) detected on the control 604A, the electronic device initiates a call request to another electronic device corresponding to a phone number shown in the user interface 31. Refer to FIG. 6H. After the another electronic device corresponding to the phone number shown in the user interface 31 accepts the call request, the electronic device selects a connected wired headset as a voice pickup device and a voice play device in a current call process.

It may be understood that, in addition to the scenario in which before the electronic device initiates the call request to the another electronic device, the user adjusts or switches the voice pickup device and the voice play device that are to be used by the electronic device in the call process and that is shown in FIG. 6E to FIG. 6H, after the electronic device receives a call request initiated by the another electronic device, the user may further adjust or switch a voice pickup device and a voice play device that are to be used by the electronic device in a call process. For example, after receiving the call request initiated by the another electronic device, the electronic device may display, on the display, the list 604 shown in FIG. 6F. After the user selects an audio device from the list, the electronic device accepts the call request, and uses the audio device selected by the user as the voice pickup device and the voice play device in the call process.

After the call process shown in FIG. 6E to FIG. 6H ends, in a next call process, if the user does not actively select an audio device as a voice pickup device and a voice play device, the electronic device selects, as the voice pickup device and the voice play device, an audio device (that is, the wired headset) used after the user performs last switching.

According to Policy (4), the user may use an audio device used after the user performs switching to make a call to a peer user. This meets a user expectation, to improve user experience.

(5) When a plurality of cases occur simultaneously, the electronic device may select, in a time sequence, an audio device as the voice pickup device and the voice play device.

The plurality of cases include any two or more of the following: The electronic device is connected to an external audio device, the user has actively selected an audio device as the voice pickup device and the voice play device, and the user has switched an audio device in a call process and uses, as the voice pickup device and the voice play device, an audio device used after the switching.

For example, it is assumed that the electronic device is connected to an external audio device 1 at a first time point, the user actively selects an audio device 2 as the voice pickup device and the voice play device at a second time point, and the user switches the voice pickup device and the voice play device to an audio device 3 at a third time point, where the audio device 1, the audio device 2, and the audio device 3 are default audio devices. In this case, when the user does not actively select an audio device as the voice pickup device and the voice play device, after establishing a call connection to another electronic device at a fourth time point, the electronic device selects the voice pickup device and the voice play device at a time point closest to the fourth time point. If the first time point is closest to the fourth time point, the electronic device selects the audio device 1 as the voice pickup device and the voice play device. If the second time point is closest to the fourth time point, the electronic device selects the audio device 2 as the voice pickup device and the voice play device. If the third time point is closest to the fourth time point, the electronic device selects the audio device 3 as the voice pickup device and the voice play device.

When the user does not actively select the audio device as the voice pickup device and the voice play device, after the electronic device selects the audio device as the voice pickup device and the voice play device by using any one of Policies (1) to (5), the electronic device may make a call to the another electronic device based on the established call connection. In addition, the audio device selected by the electronic device meets a user expectation, so that user experience can be improved.

In the foregoing embodiments, that the electronic device ends the call process means that the electronic device actively breaks the call connection on which the call process is based, or the another electronic device that makes a call to the electronic device breaks the call connection. The electronic device may actively break the call connection in any one of the following cases: receiving an operation (for example, a touch operation or a tap operation) performed on a hang-up control displayed on a display, receiving a double-tap operation performed on a volume button, or receiving an operation (for example, a touch operation or a tap operation) performed on a hang-up button on an external voice pickup device/voice play device.

In some embodiments of this application, in a call process between the electronic device and the another electronic device, a currently used voice pickup device and voice play device may be disconnected from the electronic device. Specifically, when the voice pickup device and the voice play device that are used by the electronic device are an external audio device connected to the electronic device, the external audio device may be disconnected from the electronic device. For example, a wired connection between the external audio device and the electronic device is broken, or a wireless connection between the external audio device and the electronic device is broken. After the currently used voice pickup device and voice play device are disconnected from the electronic device, the electronic device selects a new voice pickup device and voice play device again from currently available audio devices according to any one of Policies (1) to (5). This can ensure that the call process is not interrupted, and the newly selected voice pickup device and voice play device meet a user expectation.

In some embodiments of this application, in a call process between the electronic device and the another electronic device, a new external audio device may be connected to the electronic device in a wired or wireless manner. After the new external audio device is connected to the electronic device, if the new external audio device is a default audio device, the electronic device switches the new external audio device to a currently used voice pickup device and voice play device; or if the new external audio device is not a default audio device, the electronic device keeps a currently used voice pickup device and voice play device unchanged.

In some embodiments of this application, in a call process between the electronic device and the another electronic device, the user may switch an audio device to a new audio device and use the new audio device as a voice pickup device and a voice play device, that is, the user may change or adjust a currently used voice pickup device and voice play device. Herein, for a specific operation that the user switches the audio device to the new audio device and uses the new audio device as the voice pickup device and the voice play device, refer to related descriptions in Policy (4).

In this embodiment of this application, after the electronic device selects the audio device as the voice play device, if the audio device has been used as the voice play device, a volume at which the audio device plays peer audio is the same as a volume at which the audio device that is last used as the voice play device plays peer audio. Specifically, the electronic device records a volume at which each audio device that is used as a voice play device plays peer audio. The volume may be a volume that is set or adjusted by the user, to determine a volume at which the audio device that is used as the voice play device next time plays peer audio. In this way, a user habit can be retained, and user experience can be improved.

In this embodiment of this application, after the electronic device selects the audio device as the voice play device, if the audio device is used as the voice play device for the first time, a volume at which the audio device plays peer audio may be a default value. Specifically, the electronic device may store a default voice play volume for each type of audio device, or may store a same default voice play volume for all audio devices. This is not limited in this embodiment of this application.

In some embodiments of this application, regardless of whether the user actively selects the audio device as the voice pickup device and the voice play device, the electronic device may select, from a stack, an audio device as the voice pickup device and the voice pickup device in the call process. Specifically, the electronic device may store a stack including audio devices available to the electronic device, where the audio devices in the stack are sorted based on priorities. The electronic device maintains or updates the stack based on a running status of the electronic device. After the electronic device establishes a call connection to the another electronic device and in a call process between the electronic device and the another electronic device, the electronic device selects, from the stored stack, an audio device with a highest priority as the voice pickup device and the voice play device. The electronic device may maintain or update the stack by using the following several policies.

(1) When no external audio device is connected, the electronic device adjusts a priority of an audio device configured on the electronic device in the stack to the highest. A priority of a default audio device is higher than a priority of a non-default audio device, that is, a priority of an earpiece (receiver) is higher than a priority of a speaker (speaker).

Figure 7A:
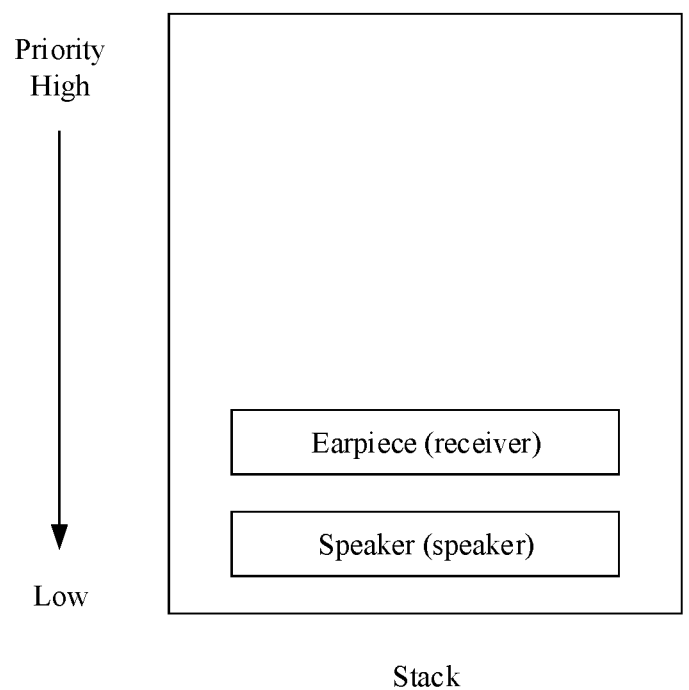
FIG. 7A to FIG. 7E are schematic diagrams of stack update according to an embodiment of this application.

FIG. 7A shows a stack obtained after an electronic device updates a stack by using Policy (1). In descending order of priorities, the stack shown in FIG. 7A sequentially includes an earpiece (receiver) and a speaker (speaker).

After the electronic device updates the stack by using Policy (1), that is, when the electronic device stores the stack shown in FIG. 7A, after establishing a call connection to another electronic device, the electronic device selects the earpiece (receiver) with a highest priority in the stack as a voice play device in a call process, and selects a microphone as a voice pickup device in the call process. This is the same as Policy (1) used by the electronic device to select the voice pickup device and the voice play device in the foregoing embodiments. For details, refer to related descriptions in the foregoing embodiments.

(2) When the electronic device is newly connected to an external audio device, the electronic device adds the newly connected external audio device to the stack. If the external audio device to which the electronic device is newly connected is a default audio device, the electronic device adjusts a priority of the newly connected external audio device in the stack to the highest, and other audio devices in the stack are in descending order of priorities. If the external audio device to which the electronic device is newly connected is not a default audio device, a priority of the newly connected external audio device in the stack is lower than priorities of all default audio devices in the stack.

Figure 7B:
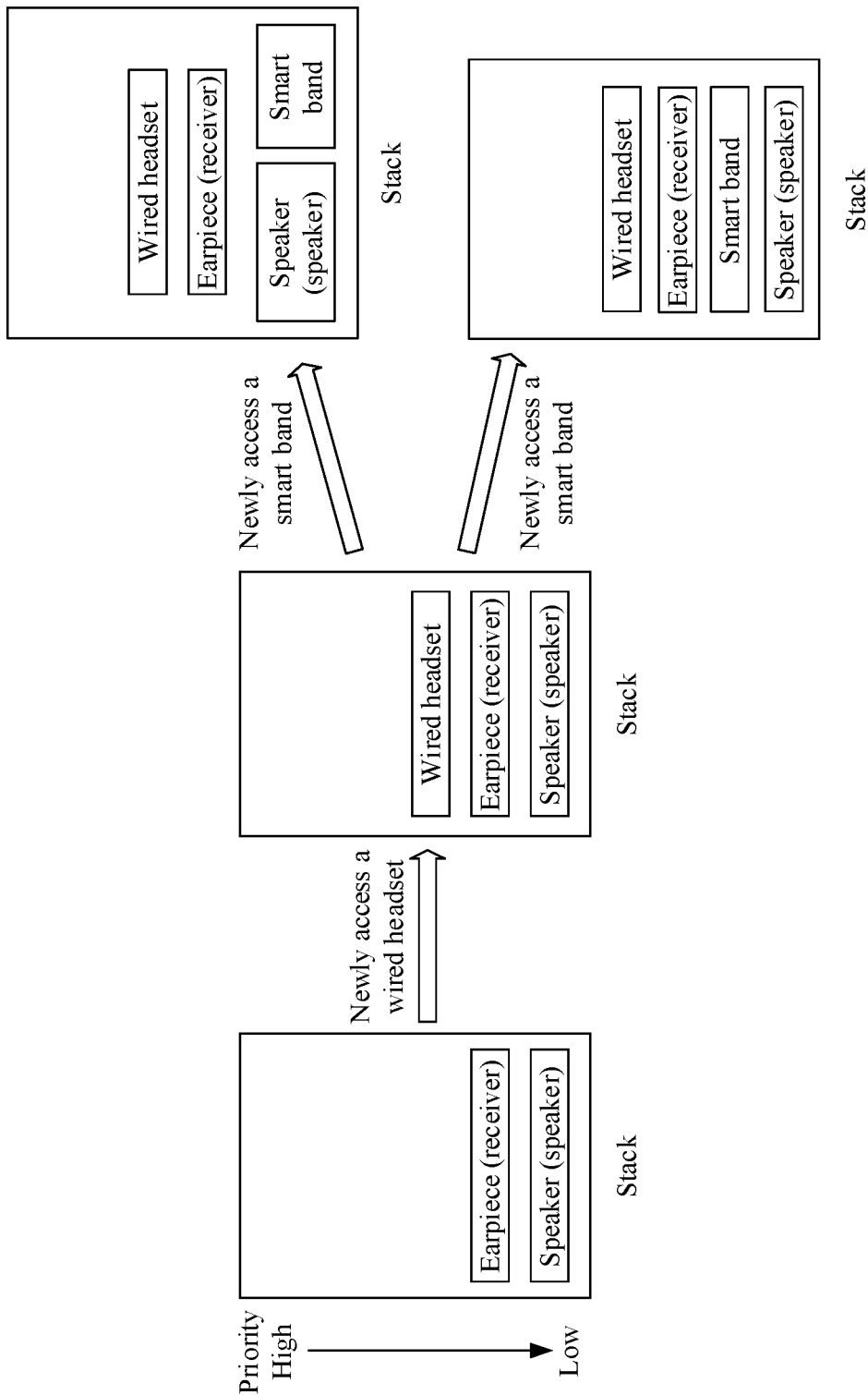

FIG. 7B is a possible schematic diagram in which an electronic device adjusts a priority of each audio device in a stack by using Policy (2).

In descending order of priorities, the first stack shown in FIG. 7B sequentially includes an earpiece (receiver) and a speaker (speaker). With reference to the second stack shown in FIG. 7B, an external audio device newly accessed by the electronic device for the first time is a wired headset, and the electronic device adds the wired headset to the stack. Because the wired headset is a default audio device, the wired headset has a highest priority in the stack.

With reference to the third stack and the fourth stack shown in FIG. 7B, an external audio device newly accessed by the electronic device for the second time is a smart band, and the electronic device adds the smart band to the stack. Because the smart band is not a default audio device, a priority of the smart band in the stack is lower than priorities of all default audio devices (for example, a wired headset and an earpiece) in the stack. In some embodiments, with reference to the third stack, audio devices that are not default audio device have a same priority in the stack. For example, the speaker (speaker) and the smart band have a lowest and same priority in the stack. In some other embodiments, with reference to the fourth stack, priorities of audio devices that are not default audio devices in the stack are arranged in a time sequence in which the audio devices are connected to the electronic device, and a later time point indicates a highest priority. For example, a priority of the smart band is higher than a priority of the speaker (speaker).

After the electronic device updates the stack by using Policy (2), after establishing a call connection to another electronic device, the electronic device selects an audio device with a highest priority in the stack as the voice play device in the call process. This is the same as Policy (2) used by the electronic device to select the voice pickup device and the voice play device in the foregoing embodiments. For details, refer to related descriptions in the foregoing embodiments.

(3) When the electronic device is disconnected from an external audio device, the electronic device deletes the external audio device from the stack, and priorities of other audio devices in the stack remain unchanged.

Figure 7C:
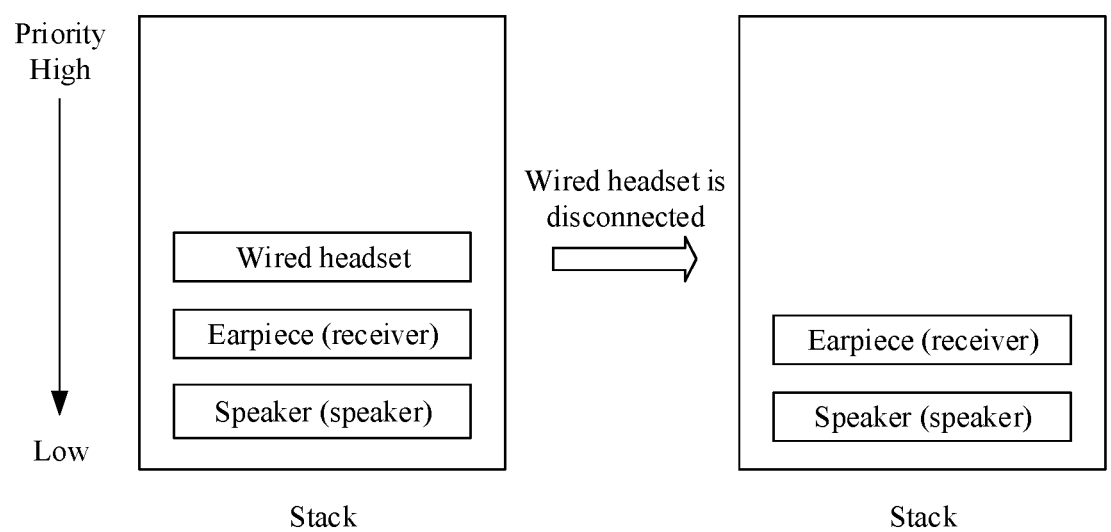

FIG. 7C is a possible schematic diagram in which an electronic device adjusts a priority of each audio device in a stack by using Policy (3). In descending order of priorities, the first stack shown in FIG. 7C sequentially includes a wired headset, an earpiece (receiver), and a speaker (speaker). After the wired headset is disconnected from the electronic device, the electronic device deletes the wired headset from the stack, and a priority relationship between the earpiece (receiver) and the speaker (speaker) remains unchanged.

(4) When the user actively selects an audio device as a voice pickup device and a voice play device, the electronic device immediately adjusts a priority of the audio device actively selected by the user in the stack to the highest, and other audio devices in the stack are in descending order of priorities. For a manner in which the user actively selects the audio device as the voice pickup device and the voice play device, refer to related descriptions in the foregoing embodiments.

Specifically, if the audio device actively selected by the user is a default audio device, the adjustment operation takes effect continuously. If the audio device actively selected by the user is not a default audio device, the adjustment operation takes effect only in a current call process. After the current call ends, the electronic device adjusts the priority of the audio device actively selected by the user in the stack to a priority after priorities of all default audio devices. This can avoid disclosing user privacy in a next call process, and reduce impact on other surrounding users.

Figure 7D:
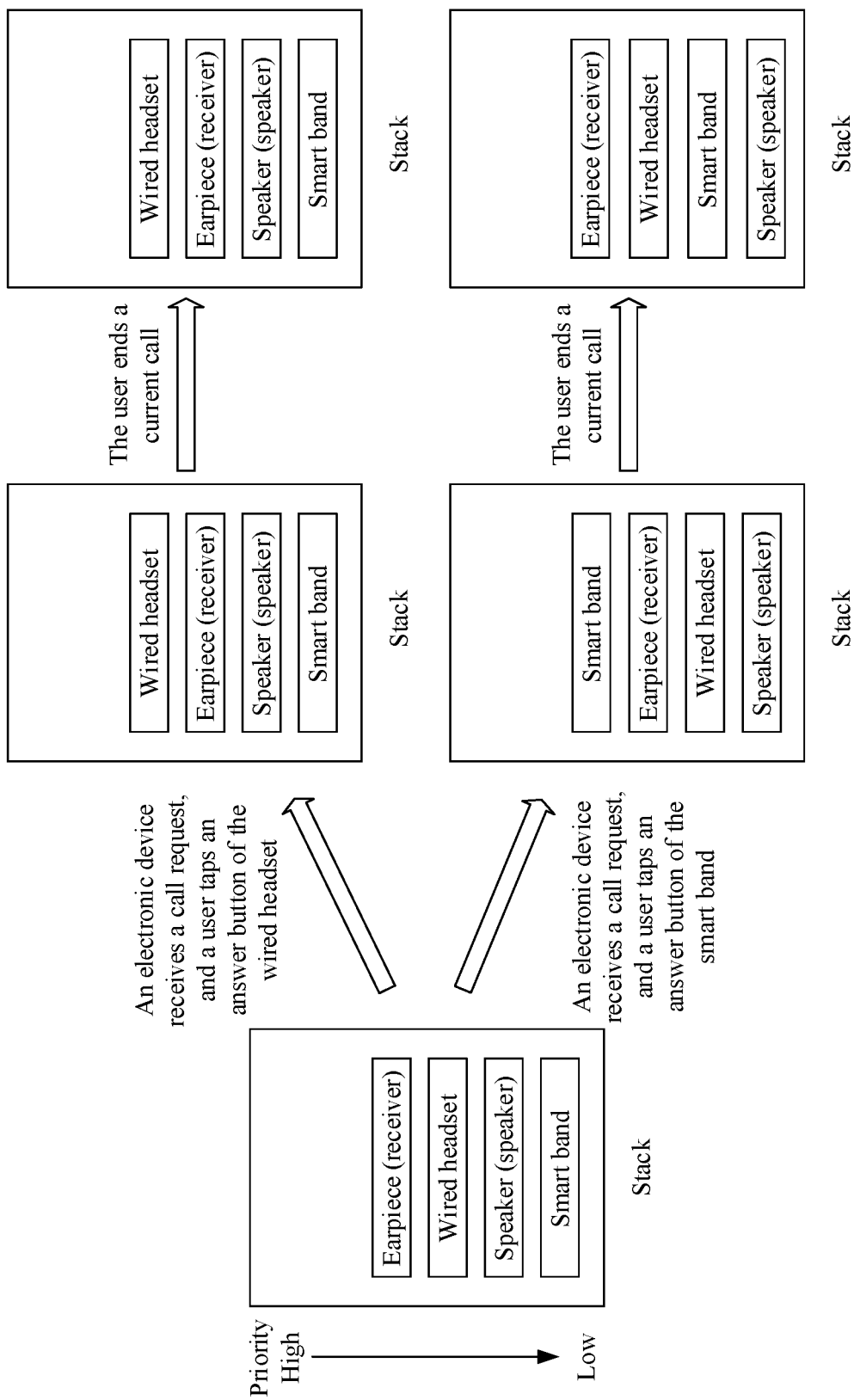

FIG. 7D is a possible schematic diagram in which an electronic device adjusts a priority of each audio device in a stack by using Policy (4).

In descending order of priorities, the first stack shown in FIG. 7D sequentially includes an earpiece (receiver), a wired headset, a speaker (speaker), and a smart band.

As shown in the first branch in FIG. 7D, when the electronic device receives a call request, if the user taps an answer button of the wired headset, the electronic device adjusts a priority of the wired headset in the stack to the highest. Because the wired headset is a default audio device, after a current call ends, the adjustment operation takes effect continuously, that is, the wired headset still has a highest priority in the stack.

As shown in the second branch in FIG. 7D, when the electronic device receives a call request, if the user taps an answer button of the smart band, the electronic device adjusts a priority of the smart band in the stack to the highest. Because the smart band is not a default audio device, the adjustment operation takes effect only in a current call process. After the current call ends, the priority of the smart band falls back to a priority after priorities of all default audio devices (for example, the earpiece (receiver) and the wired headset). The priority of the smart band may be higher than a priority of another non-default audio device (for example, the speaker (speaker)) in the stack, or may be the same as a priority of another non-default audio device (for example, the speaker (speaker)) in the stack.

After the electronic device updates the stack by using Policy (4), after establishing a call connection to another electronic device, the electronic device selects an audio device with a highest priority in the stack as the voice play device in the call process. This is the same as Policy (3) used by the electronic device to select the voice pickup device and the voice play device in the foregoing embodiments. For details, refer to related descriptions in the foregoing embodiments.

(5) When the user switches an audio device and uses, as a voice pickup device and a voice play device, an audio device used after the switching, the electronic device immediately adjusts a priority of the audio device used after the switching in the stack to the highest, and other audio devices in the stack are in descending order of priorities. Herein, for a manner in which the user switches the voice pickup device and the voice play device, refer to related descriptions in the foregoing embodiments. Details are not described herein again.

Specifically, if the audio device used after the user performs the switching is a default audio device, the adjustment operation takes effect continuously. If the audio device used after the user performs the switching is not a default audio device, the adjustment operation takes effect only in a current call process. After the current call ends, the electronic device adjusts the priority of the audio device used after the user performs the switching in the stack to a priority after priorities of all default audio devices. This can avoid disclosing user privacy in a next call process, and reduce impact on other surrounding users.

Figure 7E:
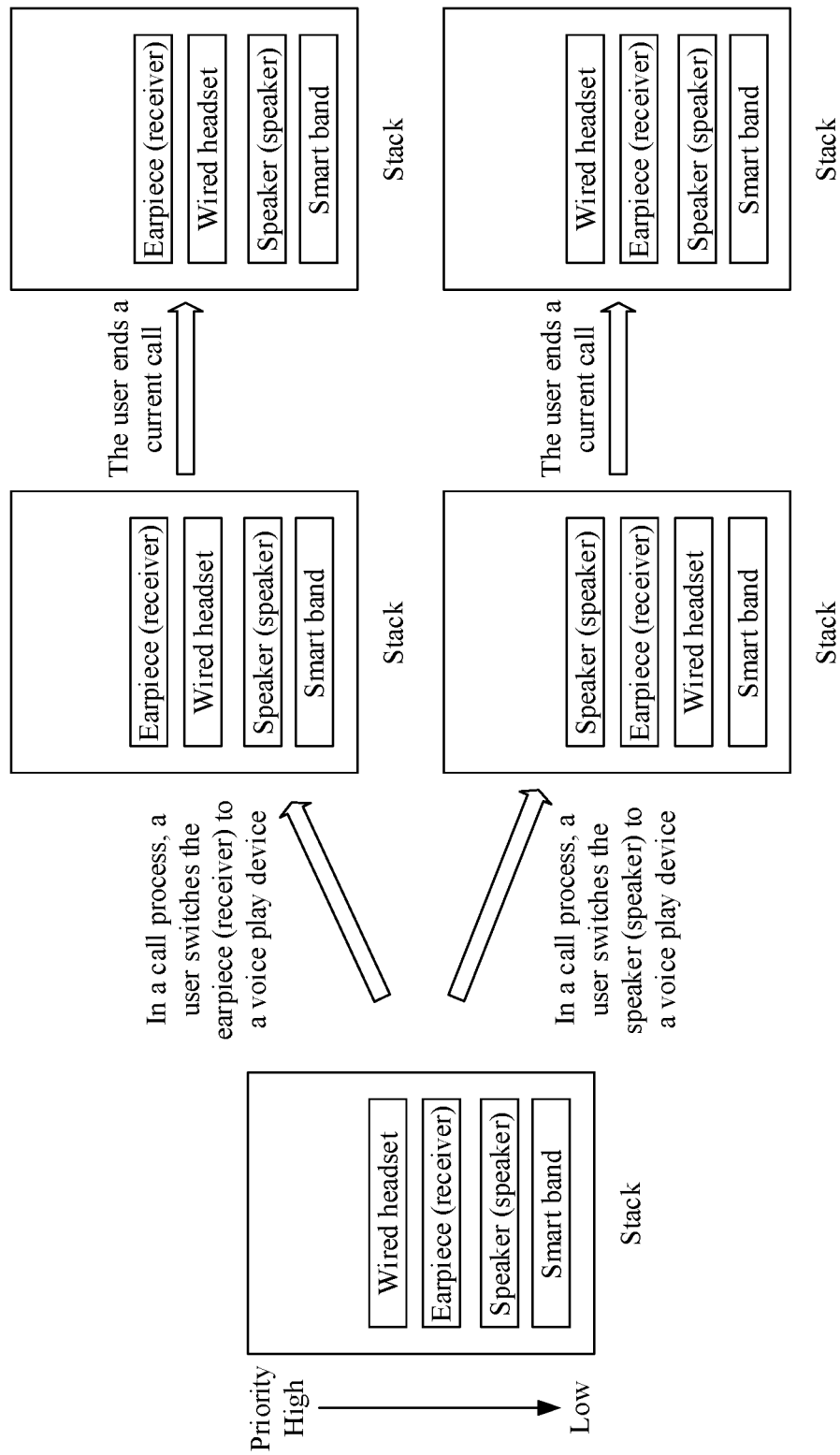

For example, FIG. 7E is a possible schematic diagram in which an electronic device adjusts a priority of each audio device in a stack by using Policy (5).

In descending order of priorities, the first stack shown in FIG. 7E sequentially includes a wired headset, an earpiece (receiver), a speaker (speaker), and a smart band.

As shown in the first branch in FIG. 7E, in a call process, if a user switches the earpiece (receiver) to a voice play device, the electronic device adjusts a priority of the earpiece (receiver) in the stack to the highest, and uses the earpiece (receiver) as the voice play device in the call process. Because the earpiece (receiver) is a default audio device, after a current call ends, the adjustment operation takes effect continuously, that is, the earpiece (receiver) still has a highest priority in the stack.

As shown in the second branch in FIG. 7E, in a call process, if the user switches the speaker (speaker) to a voice play device, the electronic device adjusts a priority of the speaker (speaker) in the stack to the highest, and uses the speaker (speaker) as the voice play device in the call process. Because the speaker (speaker) is not a default audio device, the adjustment operation takes effect only in a current call process. After the current call ends, the priority of the speaker (speaker) falls back to a priority after priorities of all default audio devices (for example, the earpiece (receiver) and the wired headset). The priority of the speaker (speaker) may be higher than a priority of another non-default audio device (for example, the smart band) in the stack, or may be the same as a priority of another non-default audio device (for example, the smart band) in the stack.

After the electronic device updates the stack by using Policy (5), after establishing a call connection to another electronic device, the electronic device selects an audio device with a highest priority in the stack as the voice play device in the call process. This is the same as Policy (4) used by the electronic device to select the voice pickup device and the voice play device in the foregoing embodiments. For details, refer to related descriptions in the foregoing embodiments.

In a stack manner, after the electronic device establishes a call connection to the another electronic device and in a call process between the electronic device and the another electronic device, the electronic device may select, from the stack, an audio device with a highest priority as the voice pickup device and the voice play device. This is convenient and facilitates management.

It may be understood that the stack mentioned above is merely a possible data form. In some other embodiments, the electronic device may further store a list of audio devices available to the electronic device or data in another form. The electronic device may update the list or the data in another form according to the foregoing policy, and after the electronic device establishes a call connection to the another electronic device and in a call process between the electronic device and the another electronic device, the electronic device selects, from the list or the data in another form, an audio device with a highest priority as the voice pickup device and voice play device.

The foregoing embodiment describes, in detail with reference to the schematic diagram of human-computer interaction provided by the electronic device, the call method provided in this application. The following describes the call method with reference to a method flowchart provided in an embodiment of this application.

Figure 8:
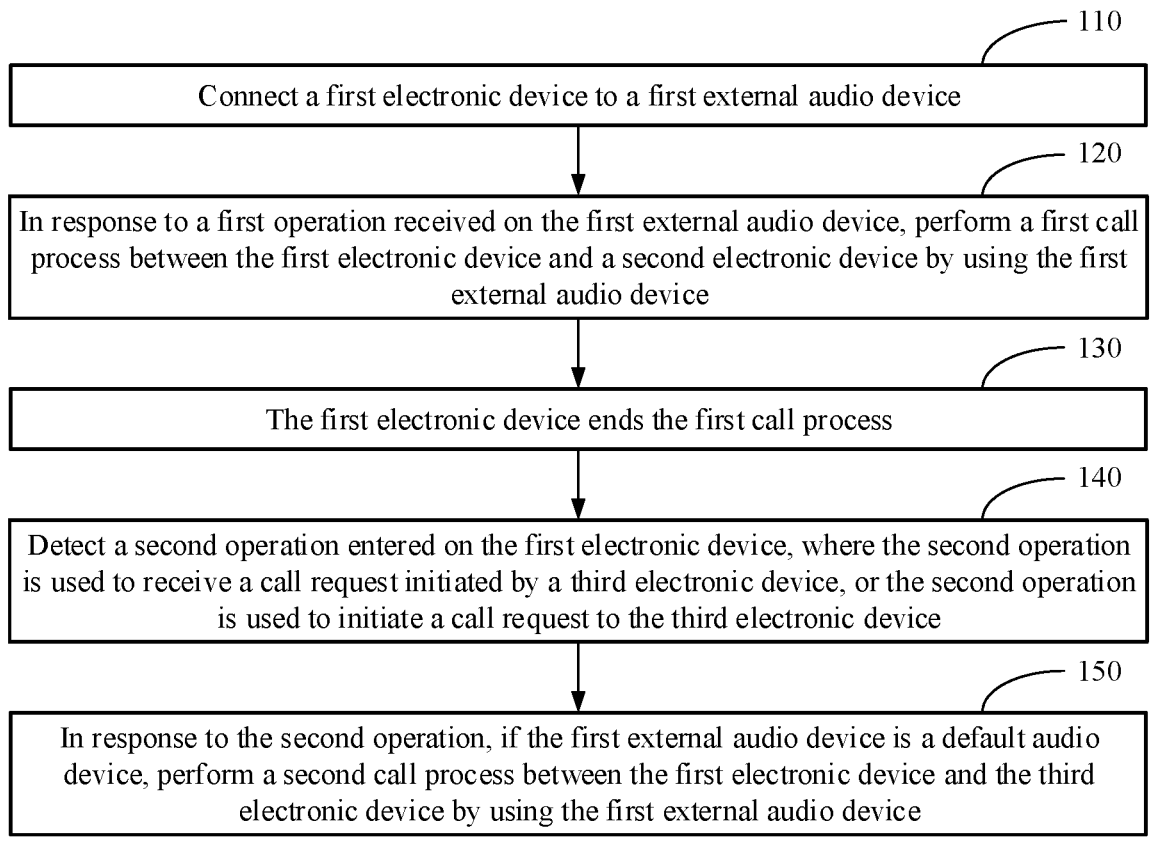
FIG. 8 is a schematic flowchart of a call method according to an embodiment of this application.

FIG. 8 is a schematic flowchart of a call method according to an embodiment of this application. In the call method shown in FIG. 8, when a user does not actively select an audio device as a voice pickup device and a voice play device, an electronic device selects the voice pickup device and the voice play device by using Policy (3). For details, refer to related descriptions in the foregoing embodiments.

Refer to FIG. 8. The call method includes the following steps.

Step S110: Connect a first electronic device to a first external audio device.

The first external audio device is an audio device externally connected to the first electronic device. The first electronic device may be connected to the first external audio device in a wired or wireless manner. A type of the first external audio device is not limited in this embodiment of this application. For a possible type of the first audio device, refer to related descriptions in the foregoing embodiments.

Step S120: In response to a first operation received on the first external audio device, perform a first call process between the first electronic device and a second electronic device by using the first external audio device, where the first external audio device is configured to: in the first call process, collect audio around the first electronic device, and play audio around the second electronic device.

In some embodiments, when the first electronic device serves as an end that initiates a call request to the second electronic device, the user may enter the first operation on the first external audio device to which the electronic device is connected, to initiate the call request to the second electronic device, and select the first external audio device as a voice pickup device and a voice play device in the call process between the first electronic device and the second electronic device. Herein, the first operation may include an operation (for example, a double-tap operation or a touch and hold operation) performed on a dial button of the first external audio device, or a gesture or a voice instruction that is entered on the first external audio device and that is used to trigger the electronic device to initiate a call request.

In some embodiments, when the first electronic device serves as an end that receives a call request initiated by the second electronic device, the user may enter the first operation on the first external audio device to which the electronic device is connected, to accept the call request initiated by the second electronic device, and select the first external audio device as a voice pickup device and a voice play device in the call process between the first electronic device and the second electronic device. Herein, the first operation may include an operation (for example, a tap operation or a touch operation) performed on an answer button of the first external audio device, or a gesture or a voice instruction that is entered on the first external audio device and that is used to trigger the first electronic device to accept a call request.

The call process between the first electronic device and the second electronic device may include: The first electronic device collects audio around the first electronic device, and sends the audio around the first electronic device to the second electronic device. The first electronic device receives audio around the second electronic device that is sent by the second electronic device, and plays the audio around the second electronic device. For ease of description, the call process between the first electronic device and the second electronic device may be referred to as the first call process.

Herein, for step S120, refer to FIG. 2A and FIG. 2B, and related descriptions that the user actively selects the audio device as the voice pickup device and the voice play device in the call process in the foregoing embodiments.

Step S130: The first electronic device ends the first call process.

That the first electronic device ends the first call process means that the first electronic device actively breaks a call connection on which the first call process is based, or the second electronic device chooses to end the first call process and break the call connection. For a manner in which the first electronic device actively breaks the call connection, refer to related descriptions in the foregoing embodiments.

Step S140: Detect a second operation entered on the first electronic device, where the second operation is used to receive a call request initiated by a third electronic device, or the second operation is used to initiate a call request to the third electronic device.

In some embodiments, when the first electronic device serves as an end that initiates the call request to the third electronic device, the user may enter the second operation on the first electronic device, to initiate the call request to the third electronic device. Herein, the second operation may include an operation (for example, a tap operation or a touch operation) entered on a display screen of the electronic device, an input voice instruction or gesture used to initiate a call request, or the like. The operation entered on the display of the electronic device may include the operation entered on the dial control 301 in the user interface shown in FIG. 3. Herein, the user interface shown in FIG. 3 may be referred to as a third user interface.

In some embodiments, when the first electronic device serves as an end that receives the call request initiated by the third electronic device, the user may enter the second operation on the first electronic device, to accept the call request initiated by the third electronic device. Herein, the second operation may include an operation entered on a display of the electronic device, an input voice instruction or gesture used to accept a call request, or the like. The operation entered on the display of the electronic device may include a slide operation entered on the answer control in the user interface 41 shown in FIG. 4a, or a tap operation, a touch operation, or the like entered on the answer control in the user interface 42 shown in FIG. 4b. Herein, the user interface shown in FIG. 4a or FIG. 4b may be referred to as a second user interface.

Herein, for a case in which the user enters the second operation on the first electronic device, that is, a case in which the user does not actively select the audio device as the voice pickup device and the voice play device, refer to related descriptions in the embodiments in FIG. 3 and FIG. 4a and FIG. 4b.

Step S150: In response to the second operation, if the first external audio device is a default audio device, perform a second call process between the first electronic device and the third electronic device by using the first external audio device, where the first external audio device is configured to: in the second call process, collect audio around the first electronic device, and play audio around the third electronic device.

After ending the first call process, as an end that initiates a call request or an end that receives a call request, the first electronic device may perform the call process between the first electronic device and the third electronic device in response to the second operation entered by the user on the first electronic device.

If the first external audio device is the default audio device, the first electronic device selects, in response to the second operation, the first external audio device as the voice pickup device and the voice play device in the call process between the first electronic device and the third electronic device.

If the first external audio device is not the default audio device, the first electronic device selects, in response to the second operation, a current audio device with a highest priority from the foregoing stack as the voice pickup device and the voice play device in the call process between the first electronic device and the third electronic device.

The call process between the first electronic device and the third electronic device may include: The first electronic device collects audio around the first electronic device, and sends the audio around the first electronic device to the third electronic device. The first electronic device receives audio around the third electronic device that is sent by the third electronic device, and plays the audio around the third electronic device. For ease of description, the call process between the first electronic device and the third electronic device may be referred to as the second call process.

Figure 9:
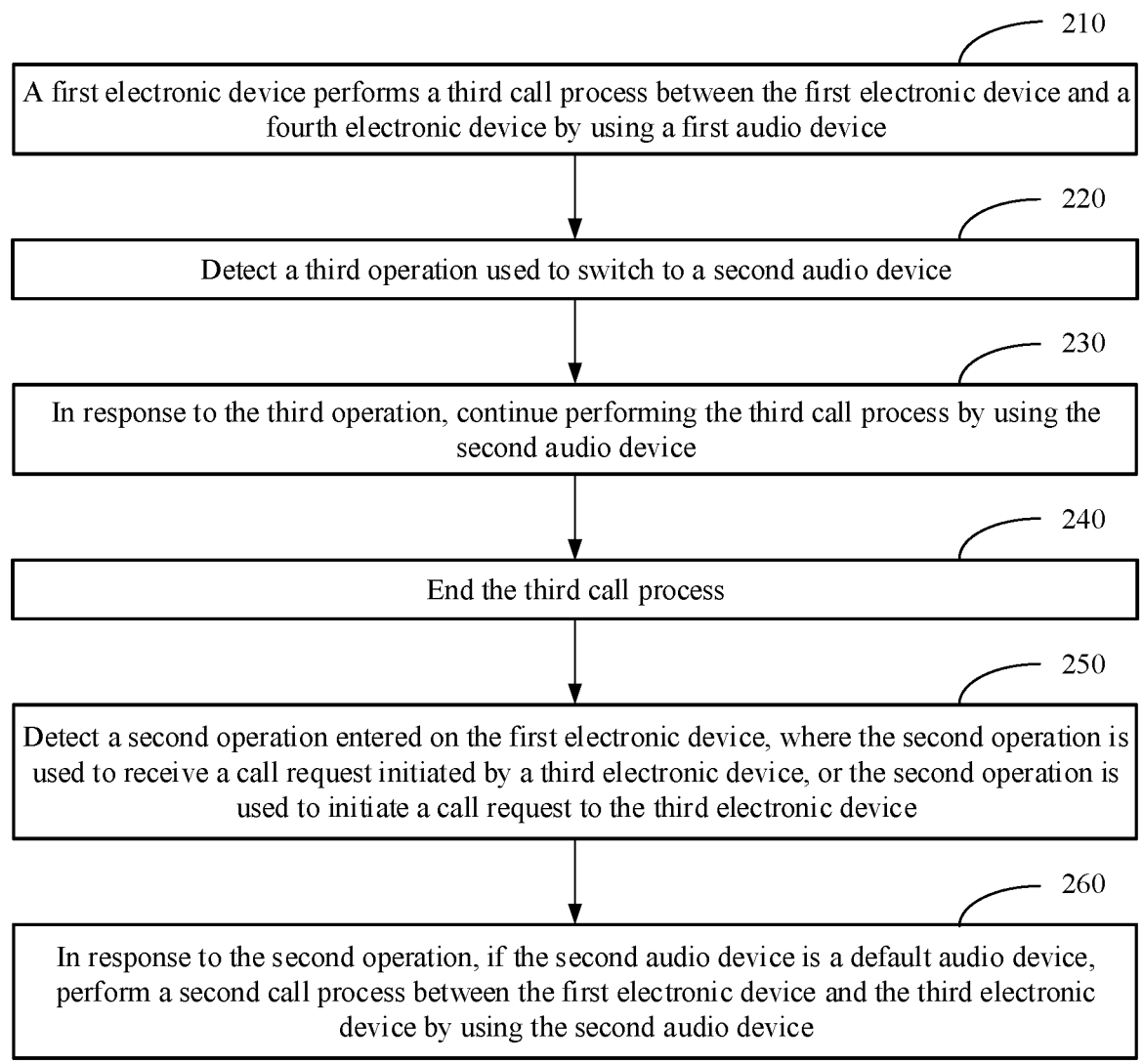
FIG. 9 is a schematic flowchart of another call method according to an embodiment of this application.

FIG. 9 is a schematic flowchart of another call method according to an embodiment of this application. In the call method shown in FIG. 9, when a user does not actively select an audio device as a voice pickup device and a voice play device, an electronic device selects the voice pickup device and the voice play device in Manner (1) in Policy (4). For details, refer to the embodiments in FIG. 6A to FIG. 6D and related descriptions.

Refer to FIG. 9. The call method includes the following steps.

Step S210: A first electronic device performs a third call process between the first electronic device and a fourth electronic device by using a first audio device, where the first audio device is configured to: in the third call process, collect audio around the first electronic device, and play audio around the fourth electronic device.

The first audio device may be an audio device configured on the first electronic device, or may be an external audio device to which the first audio device is connected. When the first audio device is the audio device configured on the first electronic device, the first audio device may include a plurality of audio devices. For example, the first audio device may include a microphone and an earpiece (receiver), or the first audio device may include a microphone and a speaker (speaker).

The call process between the first electronic device and the third electronic device may include: The first electronic device collects audio around the first electronic device, and sends the audio around the first electronic device to the fourth electronic device. The first electronic device receives audio around the fourth electronic device that is sent by the fourth electronic device, and plays the audio around the fourth electronic device. For ease of description, the call process between the first electronic device and the fourth electronic device may be referred to as the third call process.

Step S220: Detect a third operation used to switch to a second audio device.

For a manner in which the first electronic device switches an audio device in the third call process, refer to related descriptions in the foregoing embodiments in FIG. 6A to FIG. 6C. The user interface shown in FIG. 6A may be referred to as a first user interface, the icon 601 or the control 602 may be referred to as a control used to switch an audio device, and the icon and/or the text in the list 603 may be referred to as an option of an audio device. The third operation may include an operation (for example, a tap operation) performed on an option that is of a third audio device and that is in the list 603.

The second audio device is similar to the first audio device, and may be an audio device configured on the first electronic device, or may be an external audio device to which the first audio device is connected. Alternatively, the second audio device is different from the first audio device.

Step S230: In response to the third operation, continue performing the third call process by using the second audio device, where the second audio device is configured to: in the third call process, continue collecting audio around the first electronic device, and continue playing audio around the fourth electronic device.

After the user switches to the second audio device, the first electronic device immediately continues performing the third call process by using the second audio device.

Step S240: End the third call process.

A manner in which the first electronic device ends the third call process is similar to step S130 in the method shown in FIG. 8. For details, refer to related descriptions.

Step S250: Detect a second operation entered on the first electronic device, where the second operation is used to receive a call request initiated by a third electronic device, or the second operation is used to initiate a call request to the third electronic device.

Step S250 is the same as step S140 in the method shown in FIG. 8. For details, refer to related descriptions.

Step S260: In response to the second operation, if the second audio device is a default audio device, perform a second call process between the first electronic device and the third electronic device by using the second audio device, where the second audio device is configured to: in the second call process, collect audio around the first electronic device, and play audio around the third electronic device.

After ending the third call process, as an end that initiates a call request or an end that receives a call request, the first electronic device may perform the call process between the first electronic device and the third electronic device in response to the second operation entered by the user on the first electronic device.

If the second audio device is the default audio device, the first electronic device selects, in response to the second operation, the second audio device as the voice pickup device and the voice play device in the call process between the first electronic device and the third electronic device.

If the second audio device is not the default audio device, the first electronic device selects, in response to the second operation, a current audio device with a highest priority from the foregoing stack as the voice pickup device and the voice play device in the call process between the first electronic device and the third electronic device.

For the call process between the first electronic device and the third electronic device, refer to related descriptions in the method shown in FIG. 8.

In some embodiments, when the user does not actively select the audio device as the voice pickup device and the voice play device, the first electronic device may further select the voice pickup device and the voice play device by using Policy (2). Specifically, in the call methods shown in FIG. 8 and FIG. 9, the first electronic device performs the second call process between the first electronic device and the third electronic device, and after ending the second call process, the first electronic device may be further connected to a second external audio device. When the first electronic device detects a fourth operation entered on the first electronic device, in response to the fourth operation, if the second external audio device is a default audio device, the first electronic device performs a fourth call process between the first electronic device and a fifth electronic device by using the second external audio device; or if the second external audio device is not a default audio device, the first electronic device selects a current audio device with a highest priority from the foregoing stack as the voice pickup device and the voice play device in the call process between the first electronic device and the fifth electronic device. The fourth operation is used to receive a call request initiated by the fifth electronic device, or the fourth operation is used to initiate a call request to the fifth electronic device.

The first electronic device may be connected to the second external audio device in a wired or wireless manner. The second external audio device is similar to the first external audio device. For details, refer to related descriptions. Alternatively, the second external audio device is different from the first external audio device. The fourth operation is similar to the second operation, and the fourth call process is similar to the first call process. For details, refer to related descriptions.

In some embodiments, when the user does not actively select the audio device as the voice pickup device and the voice play device, the first electronic device may further select the voice pickup device and the voice play device in Manner (2) in Policy (4). For details, refer to related descriptions in the embodiments in FIG. 6E to FIG. 6H. Specifically, in the call methods shown in FIG. 8 and FIG. 9, after performing the second call process between the first electronic device and the third electronic device, the first electronic device may further perform the following steps: ending the second call process; detecting a fifth operation, where the fifth operation is used to receive a call request initiated by a sixth electronic device, or the fifth operation is used to initiate a call request to the sixth electronic device;

displaying one or more audio device options and an OK control in response to the fifth operation, where the one or more audio device options include an option of an audio device configured on the first electronic device and an option of an external audio device to which the first electronic device is connected, and the one or more audio device options include an option of a third audio device; after detecting an operation of selecting the option of the third audio device, detecting a sixth operation performed on the OK control, and in response to the sixth operation, performing a fifth call process by using the third audio device; ending the fifth call process; detecting a seventh operation entered on the first electronic device, where the seventh operation is used to receive a call request initiated by a seventh electronic device, or the seventh operation is used to initiate a call request to the seventh electronic device; and in response to the seventh operation, if the third audio device is a default audio device, performing a sixth call process between the first electronic device and the seventh electronic device by using the third audio device; or if the second external audio device is not a default audio device, selecting, by the first electronic device, a current audio device with a highest priority from the foregoing stack as the voice pickup device and the voice play device in the call process between the first electronic device and the seventh electronic device.

The fifth operation is similar to the second operation, and the fifth call process is similar to the first call process. For details, refer to related descriptions.

For the one or more audio device options and the OK control displayed in response to the fifth operation, refer to each audio device option and the OK control 604A in the user interface shown in FIG. 6G. The sixth operation may be specifically a tap operation, a touch operation, or the like performed on the OK control 604.

The seventh operation is similar to the second operation, and the sixth call process is similar to the first call process. For details, refer to related descriptions.

It may be understood that the second electronic device, the third electronic device, the fourth electronic device, the fifth electronic device, the sixth electronic device, and the seventh electronic device mentioned above may be the same or different. This is not limited in this application.

There may be one or more second electronic devices, third electronic devices, fourth electronic devices, fifth electronic devices, sixth electronic devices, and seventh electronic devices mentioned above. This is not limited in this application.

For the default audio device mentioned in the foregoing call methods shown in FIG. 8 and FIG. 9, refer to related descriptions about the default audio device in the foregoing human-computer interaction embodiments. Details are not described herein again.

In some embodiments, the first electronic device stores one or more priorities of one or more audio devices, the one or more audio devices include an audio device configured on the electronic device and an external audio device to which the electronic device is connected, and an audio device with a highest priority is configured to perform a call process between the first electronic device and another electronic device. For a manner in which the first electronic device stores and updates a priority of each audio device, refer to related descriptions about the stack in the embodiments in FIG. 7A to FIG. 7E.

An embodiment of this application provides a corresponding apparatus, to perform the call method provided in the foregoing embodiment. The following describes an electronic device provided in embodiments of this application.

Figure 10A:
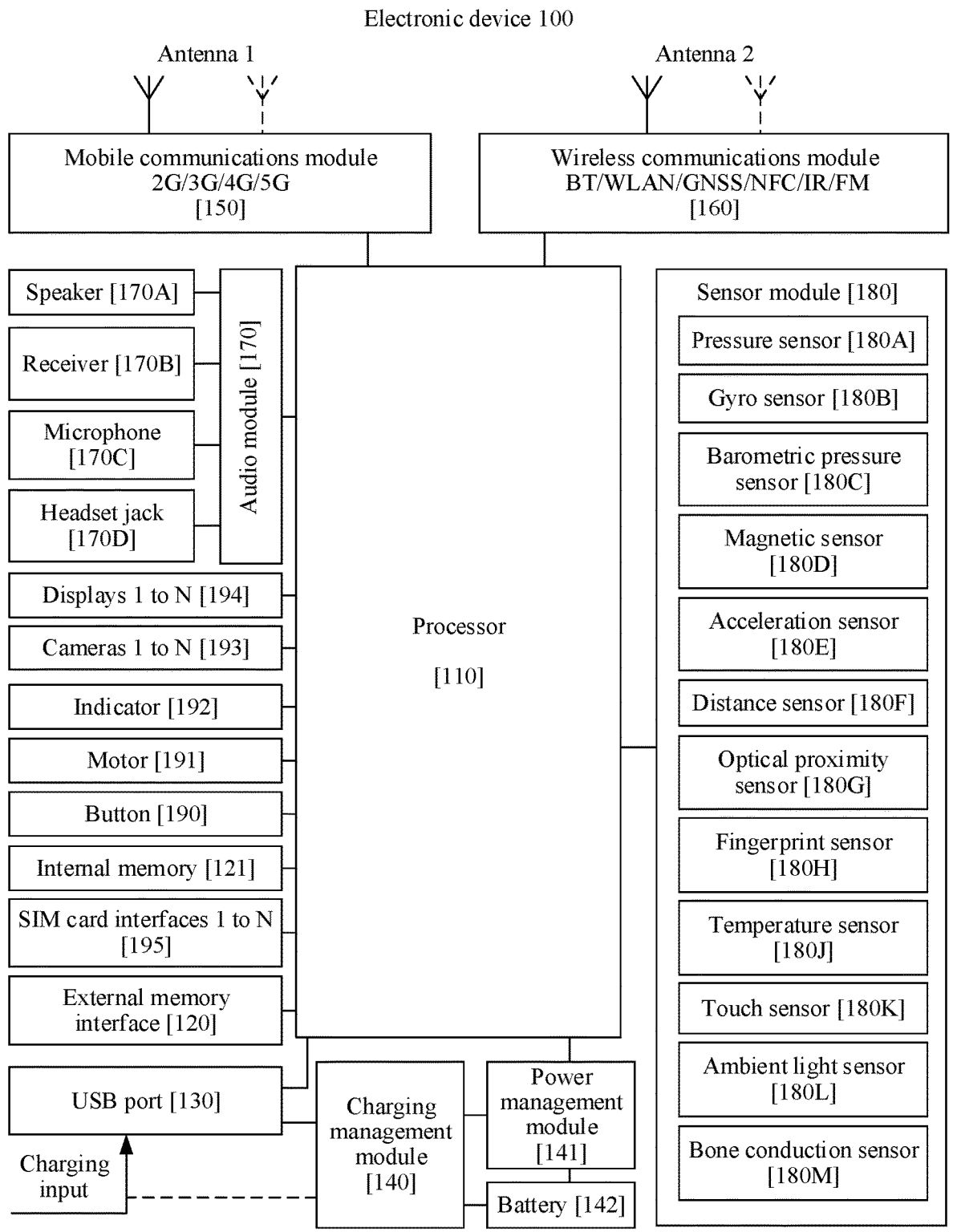
FIG. 10A is a schematic diagram of a structure of an electronic device according to an embodiment of this application.

FIG. 10A is a schematic diagram of a structure of an electronic device 100 according to an embodiment of this application.

FIG. 10A is a schematic diagram of a structure of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this application does not constitute a specific limitation on the electronic device 100. In some other embodiments of this application, the electronic device 100 may include more or fewer components than those shown in the figure, or may combine some components, or may split some components, or may have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces a waiting time of the processor 110, so that system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identification module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flashlight, the camera 193, and the like through different I2C bus interfaces. For example, the processor 110 may be coupled to the touch sensor 180K through an I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transfer an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may alternatively transfer an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transfer an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI, to implement a photographing function of the electronic device 100. The processor 110 communicates with the display 194 through the DSI, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB Type-C port, or the like. The USB port 130 may be configured to connect to the charger to charge the electronic device 100, or may be configured to transmit data between the electronic device 100 and a peripheral device. The USB port 130 may alternatively be configured to connect to a headset, to play audio by using the headset. Alternatively, the port may be configured to connect to another electronic device, for example, an AR device.

It may be understood that an interface connection relationship between the modules illustrated in this embodiment of this application is merely used as an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input through a wireless charging coil of the electronic device 100. The charging management module 140 may further supply power to the electronic device by using the power management module 141 while charging the battery 142.

The power management module 141 is configured to connect the battery 142 and the charging management module 140 to the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication bands. Different antennas may be further multiplexed to improve antenna utilization. For example, the antenna 1 may be multiplexed as a diversity antenna in a wireless local area network. In some other embodiments, an antenna may be used in combination with a tuning switch.

The mobile communications module 150 may provide a wireless communication solution that includes 2G/3G/4G/

5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules of the mobile communications module 150 may be disposed in the processor 110. In some embodiments, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another functional module.

The wireless communications module 160 may provide a wireless communication solution that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), or infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 implements a display function by using the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini LED, a micro LED, a micro OLED, a quantum dot light-emitting diode (quantum dot light-emitting diodes, QLED), or the like. In some embodiments, the electronic device 100 may include one or N displays 194, where N is a positive integer greater than 1.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to: compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. The NPU can implement applications such as intelligent cognition of the electronic device 100, such as image recognition, facial recognition, speech recognition, and text understanding.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (such as audio data and a phone book) and the like that are created during use of the electronic device 100. In addition, the internal memory 121 may include a high-speed random access memory, or may include a nonvolatile memory such as at least one magnetic disk storage device, a flash memory, or a universal flash storage (universal flash storage, UFS). The processor 110 runs the instructions stored in the internal memory 121 and/or the instructions stored in the memory disposed in the processor, to perform various function applications and data processing of the electronic device 100.

The electronic device 100 may implement audio functions, for example, music playing and recording, by using the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be the USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a motion posture of the electronic device 100. In some embodiments, an angular velocity of the electronic device 100 around three axes (that is, axes X, Y, and Z) may be determined by using the gyro sensor 180B. The gyro sensor 180B may be configured to perform image stabilization during photographing. For example, when a shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a value of the barometric pressure measured by the barometric pressure sensor 180C, to assist in positioning and navigation.

The magnetic sensor 180D includes a Hall sensor. The electronic device 100 may detect opening and closing of a flip cover leather case by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect magnitudes of accelerations of the electronic device 100 in various directions (usually on three axes), and may detect a magnitude and a direction of gravity when the electronic device 100 is still. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen. The touch sensor 180K is configured to detect a touch operation performed on or near the touch sensor 180K. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal part. The bone conduction sensor 180M may also be in contact with a human pulse, to receive a blood pressure beating signal. In some embodiments, the bone conduction sensor 180M may alternatively be disposed in the headset, to obtain a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some embodiments, the electronic device 100 uses an eSIM, that is, an embedded SIM card. The eSIM card may be embedded into the electronic device 100, and cannot be separated from the electronic device 100.

In some embodiments of this application, the display 194 may be configured to detect an operation used to initiate a call request to another electronic device. In response to this operation, the processor 110 selects, from audio devices available to the electronic device 100, an audio device that meets a user expectation as a voice pickup device and a voice play device. Herein, for a specific operation that the processor 110 selects the audio device that meets the user expectation as the voice pickup device and the voice play device, refer to related descriptions in the foregoing method embodiments.

In some embodiments of this application, the display 194 may be configured to detect an operation used to receive a call request initiated by another electronic device. In response to this operation, the processor 110 selects, from audio devices available to the electronic device 100, an audio device that meets a user expectation as a voice pickup device and a voice play device. Herein, for a specific operation that the processor 110 selects the audio device that meets the user expectation as the voice pickup device and the voice play device, refer to related descriptions in the foregoing method embodiments.

In some embodiments of this application, the memory 121 may be configured to store a stack including audio devices available to the electronic device 100. For detailed descriptions of the stack, refer to related descriptions in the foregoing method embodiments. In some embodiments, the processor 110 may select, from the stack stored in the memory 121, an audio device with a highest priority as a voice pickup device and a voice play device.

A software system of the electronic device 100 may use a layered architecture, an event-driven architecture, a microkernel architecture, a micro service architecture, or a cloud architecture. In this embodiment of this application, an Android system of a layered architecture is used as an example to describe a software structure of the electronic device 100.

Figure 10B:
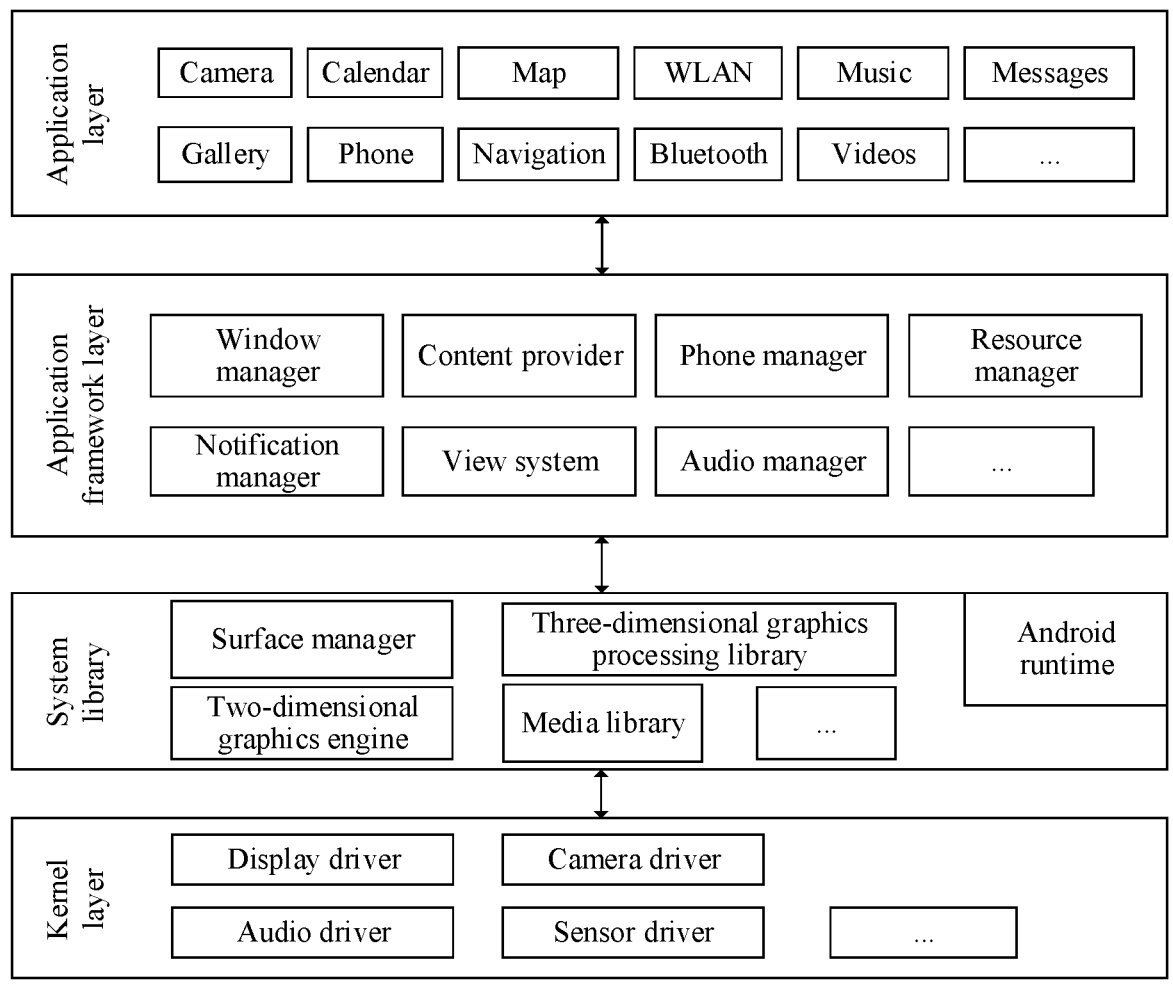
FIG. 10B is a block diagram of a software architecture of an electronic device according to an embodiment of this application.

FIG. 10B is a block diagram of a software structure of an electronic device 100 according to an embodiment of this application.

In the layered architecture, software is divided into several layers, and each layer has a clear role and task. The layers communicate with each other through a software interface. In some embodiments, an Android system is divided into four layers, that is, an application layer, an application framework layer, an Android runtime (Android runtime) and system library, and a kernel layer from top to bottom.

The application layer may include a series of application packages.

As shown in FIG. 10B, the application package may include applications such as Camera, Gallery, Calendar, Phone, Map, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 10B, the application framework layer may include a window manager, a content provider, a view system, a phone manager, a resource manager, a notification manager, an audio manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying a picture. The view system may be configured to construct an application. A display interface may include one or more views. For example, a display interface including an SMS message notification icon may include a text display view and a picture display view.

The phone manager is configured to provide communication functions of the electronic device 100, for example, management of a call status (for example, dialing, answering, or hanging up) of the electronic device, obtaining of information (for example, device information, SIM card information, and network information) about the electronic device, and listening of a status (for example, signal strength) of the electronic device.

In this embodiment of this application, the audio manager may select, from audio devices available to the electronic device 100, an audio device that meets a user expectation as a voice pickup device and a voice play device of the electronic device 100 and another electronic device in a call process. In some embodiments, the audio manager may be configured to store a stack including audio devices available to the electronic device 100. Further, the audio manager may select, from the stored stack, an audio device with a highest priority as a voice pickup device and a voice play device of the electronic device 100 and another electronic device in a call process. Herein, for the stack stored in the audio manager and a specific implementation in which the audio manager selects the voice pickup device and the voice play device, refer to related descriptions in the foregoing method embodiments. Details are not described herein again.

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted for in the status bar, an announcement is produced, the electronic device vibrates, or an indicator light blinks.

The Android runtime includes a core library and a virtual machine. The Android runtime is responsible for scheduling and management of the Android system.

The core library includes two parts: a function that needs to be invoked in Java language and a core library of Android.

The application layer and the application framework layer run on the virtual machine. The virtual machine executes Java files at the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes examples of working procedures of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a single-tap touch operation and a control corresponding to the single-tap operation is a control of a camera application icon. A camera application invokes an interface at the application framework layer, so that the camera application is opened. Then, a camera driver is started by invoking the kernel layer, and a static image or a video is captured by using the camera 193.

The implementations of this application may be randomly combined to achieve different technical effects.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk)), or the like.

A person of ordinary skill in the art may understand that all or some of the procedures of the methods in the foregoing embodiments may be implemented by a computer program instructing related hardware. The program may be stored in a computer-readable storage medium. When the program is executed, the procedures of the methods in the foregoing embodiments may be performed. The storage medium includes any medium that can store program code, for example, a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. An electronic device, wherein the electronic device comprises one or more processors and a memory; and the memory is coupled to the one or more processors, the memory is configured to store computer program code, the computer program code comprises computer instructions, and the one or more processors invoke the computer instructions to enable the electronic device to perform the following operations:

connecting to a first external audio device, wherein the first external audio device is a default audio device;

in response to a first operation received on the first external audio device, performing a first call process between the electronic device and a second electronic device by using the first external audio device, and adjusting a priority of the first external audio device to the highest priority, wherein the first external audio device is configured to: in the first call process, collect audio around the electronic device, and play audio around the second electronic device, and wherein an audio device with a highest priority is configured to perform a call process between the electronic device and another electronic device;

ending the first call process;

detecting a second operation entered on the electronic device, wherein the second operation is used to receive a call request initiated by a third electronic device, or the second operation is used to initiate a call request to the third electronic device; and in response to the second operation, performing a second call process between the electronic device and the third electronic device by using the first external audio device, wherein the first external audio device is configured to: in the second call process, collect audio around the electronic device, and play audio around the third electronic device.

2. The electronic device according to claim 1, wherein a dial button or an answer button is disposed on the first external audio device; and the first operation comprises an operation performed on the dial button or an operation performed on the answer button.

3. The electronic device according to claim 1, wherein the memory is further configured to store one or more priorities of one or more audio devices, the one or more audio devices comprise an audio device configured on the electronic device and an external audio device to which the electronic device is connected.

4. The electronic device according to claim 1, wherein the one or more processors are further configured to invoke the computer instructions to enable the electronic device to perform the following operations:

ending the second call process after performing the second call process between the electronic device and the third electronic device;

connecting to a second external audio device, wherein the second external audio device is a default audio device;

detecting a fourth operation entered on the electronic device, wherein the fourth operation is used to receive a call request initiated by a fifth electronic device, or the fourth operation is used to initiate a call request to the fifth electronic device; and in response to the fourth operation, performing a fourth call process between the electronic device and the fifth electronic device by using the second external audio device, wherein the second external audio device is configured to: in the fourth call process, collect audio around the electronic device, and play audio around the fifth electronic device.

5. The electronic device according to claim 4, wherein the one or more processors are further configured to invoke the computer instructions to enable the electronic device to perform the following operation:

after connecting to the second external audio device adjusting a priority of the second external audio device to the highest.

6. The electronic device according to claim 1, wherein the one or more processors are further configured to invoke the computer instructions to enable the electronic device to perform the following operations:

ending the second call process after performing the second call process between the electronic device and the third electronic device;

detecting a fifth operation, wherein the fifth operation is used to receive a call request initiated by a sixth electronic device, or the fifth operation is used to initiate a call request to the sixth electronic device;

displaying one or more audio device options in response to the fifth operation, wherein the one or more audio device options comprise an option of an audio device configured on the electronic device and an option of an external audio device to which the electronic device is connected, and the one or more audio device options comprise an option of a third audio device;

detecting an operation of selecting the option of the third audio device, performing a fifth call process between the electronic device and the sixth electronic device by using the third audio device, wherein the third audio device is a default audio device and is configured to: in the fifth call process, collect audio around the electronic device, and play audio around the sixth electronic device;

ending the fifth call process;

detecting a seventh operation entered on the electronic device, wherein the seventh operation is used to receive a call request initiated by a seventh electronic device, or the seventh operation is used to initiate a call request to the seventh electronic device; and in response to the seventh operation, performing a sixth call process between the electronic device and the seventh electronic device by using the third audio device, wherein the third audio device is configured to: in the sixth call process, collect audio around the electronic device, and play audio around the seventh electronic device.

7. The electronic device according to claim 6, wherein the one or more processors are further configured to invoke the computer instructions to enable the electronic device to perform the following operation:

adjusting a priority of the third audio device to the highest in response to the operation of selecting the option of the third audio device.

8. The electronic device according to claim 1, wherein the electronic device further comprises a display, and the one or more processors are further configured to invoke the computer instructions to enable the electronic device to perform the following operations:

before detecting the second operation entered on the electronic device, receiving the call request initiated by the third electronic device, and displaying a second user interface on the display in response to the call request, wherein the second user interface comprises an answer control and a hang-up control, and the second operation comprises an operation performed on the answer control; or before detecting the second operation entered on the electronic device, displaying a third user interface on the display, wherein the third user interface comprises an identifier associated with the third electronic device and a dial control, and the second operation comprises an operation performed on the dial control.

9. The electronic device according to claim 1, wherein the default audio device comprises an audio device whose maximum decibel value existing during audio play is less than a threshold.

10. The electronic device according to claim 1, wherein the default audio device comprising at least one of the following devices: a Bluetooth headset, a Bluetooth speaker, A Type-C wired headset and a 3.5 mm/2.5 mm wired headset, and non-default audio device comprising at least one of the following devices: a Bluetooth watch, a Bluetooth band, a USB speaker, a Wi-Fi speaker, a Wi-Fi set-top box, and a Wi-Fi television.

11. An electronic device, wherein the electronic device comprises one or more processors and a memory; and the memory is coupled to the one or more processors, the memory is configured to store computer program code, the computer program code comprises computer instructions, and the one or more processors invoke the computer instructions to enable the electronic device to perform the following operations:

performing a third call process between the electronic device and a fourth electronic device by using a first audio device, wherein the first audio device is configured to: in the third call process, collect audio around the electronic device, and play audio around the fourth electronic device;

detecting a third operation used to switch to a second audio device, wherein the second audio device is a default audio device;

in response to the third operation, continuing performing the third call process by using the second audio device, and adjusting a priority of the second audio device to the highest priority, wherein the second audio device is configured to: in the third call process, continue collecting audio around the electronic device, and continue playing audio around the fourth electronic device, wherein an audio device with a highest priority is configured to perform a call process between the electronic device and another electronic device;

ending the third call process;

detecting a second operation entered on the electronic device, wherein the second operation is used to receive a call request initiated by a third electronic device, or the second operation is used to initiate a call request to the third electronic device; and in response to the second operation, performing a second call process between the electronic device and the third electronic device by using the second audio device, wherein the second audio device is configured to: in the second call process, collect audio around the electronic device, and play audio around the third electronic device.

12. The electronic device according to claim 11, wherein the electronic device further comprises a display, and the one or more processors are further configured to invoke the computer instructions to enable the electronic device to perform the following operations:

before detecting, in the third call process that is between the electronic device and the fourth electronic device and that is performed by using the first audio device, the third operation used to switch to the second audio device, displaying a first user interface on the display, wherein the first user interface comprises a control for switching an audio device; and displaying one or more audio device options on the display in response to an operation detected on the control for switching an audio device, wherein the one or more audio device options comprise an option of an audio device configured on the electronic device and an option of an external audio device to which the electronic device is connected, and the one or more audio device options comprise an option of the second audio device; and the third operation used to switch to the second audio device comprises an operation performed on the option of the second audio device.

13. The electronic device according to claim 11, wherein the memory is further configured to store one or more priorities of one or more audio devices, the one or more audio devices comprise an audio device configured on the electronic device and/or an external audio device to which the electronic device is connected.

14. The electronic device according to claim 11, wherein the one or more processors are further configured to invoke the computer instructions to enable the electronic device to perform the following operations:

ending the second call process after performing the second call process between the electronic device and the third electronic device;

detecting a fifth operation, wherein the fifth operation is used to receive a call request initiated by a sixth electronic device, or the fifth operation is used to initiate a call request to the sixth electronic device;

displaying one or more audio device options in response to the fifth operation, wherein the one or more audio device options comprise an option of an audio device configured on the electronic device and an option of an external audio device to which the electronic device is connected, and the one or more audio device options comprise an option of a third audio device;

after detecting an operation of selecting the option of the third audio device, performing a fifth call process between the electronic device and the sixth electronic device by using the third audio device, wherein the third audio device is a default audio device and is configured to: in the fifth call process, collect audio around the electronic device, and play audio around the sixth electronic device;

ending the fifth call process;

detecting a seventh operation entered on the electronic device, wherein the seventh operation is used to receive a call request initiated by a seventh electronic device, or the seventh operation is used to initiate a call request to the seventh electronic device; and in response to the seventh operation, performing a sixth call process between the electronic device and the seventh electronic device by using the third audio device, wherein the third audio device is configured to: in the sixth call process, collect audio around the electronic device, and play audio around the seventh electronic device.

15. The electronic device according to claim 11, wherein the one or more processors are further configured to invoke the computer instructions to enable the electronic device to perform the following operation:

adjusting a priority of the third audio device to the highest in response to the operation of selecting the option of the third audio device.

16. The electronic device according to claim 11, wherein the electronic device further comprises a display, and the one or more processors are further configured to invoke the computer instructions to enable the electronic device to perform the following operations:

before detecting the second operation entered on the electronic device, receiving the call request initiated by the third electronic device, and displaying a second user interface on the display in response to the call request, wherein the second user interface comprises an answer control and a hang-up control, and the second operation comprises an operation performed on the answer control; or before detecting the second operation entered on the electronic device, displaying a third user interface on the display, wherein the third user interface comprises an identifier associated with the third electronic device and a dial control, and the second operation comprises an operation performed on the dial control.

17. The electronic device according to claim 11, wherein the default audio device comprising at least one of the following devices: a Bluetooth headset, a Bluetooth speaker, A Type-C wired headset and a 3.5 mm/2.5 mm wired headset, and non-default audio device comprising at least one of the following devices: a Bluetooth watch, a Bluetooth band, a USB speaker, a Wi-Fi speaker, a Wi-Fi set-top box, and a Wi-Fi television.

18. An electronic device comprising one or more processors and a memory coupled to the one or more processors, wherein the memory is configured to store computer program code comprising computer instructions, and the one or more processors invoke the computer instructions to enable the electronic device to perform the following operations:

performing a third call process between the electronic device and a fourth electronic device by using a first audio device, wherein the first audio device is configured to: in the third call process, collect audio around the electronic device, and play audio around the fourth electronic device;

detecting a third operation used to switch to a second audio device, wherein the second audio device is a default audio device;

in response to the third operation, continue performing the third call process by using the second audio device, wherein the second audio device is configured to: in the third call process, continue collecting audio around the electronic device, and continue playing audio around the fourth electronic device;

ending the third call process;

detecting a second operation entered on the electronic device, wherein the second operation is used to receive a call request initiated by a third electronic device, or the second operation is used to initiate a call request to the third electronic device; and in response to the second operation, performing a second call process between the electronic device and the third electronic device by using the second audio device, wherein the second audio device is configured to: in the second call process, collect audio around the electronic device, and play audio around the third electronic device;

ending the second call process;

detecting a fifth operation used to receive a call request initiated by a sixth electronic device, or the fifth operation is used to initiate a call request to the sixth electronic device;

displaying one or more audio device options in response to the fifth operation, wherein the one or more audio device options comprise an option of an audio device configured on the electronic device and an option of an external audio device to which the electronic device is connected, and the one or more audio device options comprise an option of a third audio device;

detecting an operation of selecting the option of the third audio device, performing a fifth call process between the electronic device and the sixth electronic device by using the third audio device, wherein the third audio device is a default audio device and is configured to: in the fifth call process, collect audio around the electronic device, and play audio around the sixth electronic device;

ending the fifth call process;

detecting a seventh operation entered on the electronic device, wherein the seventh operation is used to receive a call request initiated by a seventh electronic device, or the seventh operation is used to initiate a call request to the seventh electronic device; and in response to the seventh operation, performing a sixth call process between the electronic device and the seventh electronic device by using the third audio device, wherein the third audio device is configured to: in the sixth call process, collect audio around the electronic device, and play audio around the seventh electronic device.

19. The electronic device according to claim 18, wherein an audio device with a highest priority is configured to perform a call process between the electronic device and another electronic device;

the one or more processors are further configured to invoke the computer instructions to enable the electronic device to perform the following operation:

adjusting a priority of the second audio device to the highest in response to the third operation; adjusting a priority of the third audio device to the highest in response to operation of selecting the option of the third audio device.

20. The electronic device according to claim 18, wherein performing a second call process between the electronic device and the third electronic device by using the second audio device comprising:

performing a second call process between the electronic device and the third electronic device by using the second audio device based on the second audio device being a default audio device last and actively selected by a user as a voice pickup device and a voice play device in a previous call process.

21. The electronic device according to claim 18, wherein the electronic device further comprises a display, and the one or more processors are further configured to invoke the computer instructions to enable the electronic device to perform the following operations:

before detecting the second operation entered on the electronic device, receiving the call request initiated by the third electronic device, and displaying a second user interface on the display in response to the call request, wherein the second user interface comprises an answer control and a hang-up control, and the second operation comprises an operation performed on the answer control; or before detecting the second operation entered on the electronic device, displaying a third user interface on the display, wherein the third user interface comprises an identifier associated with the third electronic device and a dial control, and the second operation comprises an operation performed on the dial control.

22. The electronic device according to claim 18, wherein the default audio device comprising at least one of the following devices: a Bluetooth headset, a Bluetooth speaker, A Type-C wired headset and a 3.5 mm/2.5 mm wired headset, and non-default audio device comprising at least one of the following devices: a Bluetooth watch, a Bluetooth band, a USB speaker, a Wi-Fi speaker, a Wi-Fi set-top box, and a Wi-Fi television.

* * * * *